US012584021B2

(12) United States Patent
Wittmann et al.

(10) Patent No.: US 12,584,021 B2
(45) Date of Patent: Mar. 24, 2026

(54) PARTICULATE CARBON MATERIAL PRODUCIBLE FROM RENEWABLE RAW MATERIALS AND METHOD FOR ITS PRODUCTION

(71) Applicant: Suncoal Industries GmbH, Ludwigsfelde (DE)

(72) Inventors: Tobias Wittmann, Berlin (DE); Klaus Bergemann, Wildau (DE)

(73) Assignee: Suncoal Industries GmbH, Ludwigsfelde (DE)

( * ) Notice: Subject to any disclaimer, the term of this patent is extended or adjusted under 35 U.S.C. 154(b) by 760 days.

(21) Appl. No.: 17/585,004

(22) Filed: Jan. 26, 2022

(65) Prior Publication Data

US 2022/0145085 A1 May 12, 2022

Related U.S. Application Data

(63) Continuation of application No. 17/468,253, filed on Sep. 7, 2021, and a continuation of application No. 17/468,246, filed on Sep. 7, 2021, now Pat. No. 11,306,209, said application No. 17/468,253 is a continuation of application No. 16/847,523, filed on Apr. 13, 2020, now Pat. No. 11,639,444, which is a continuation of application No. 15/777,906, filed as application No. PCT/EP2016/078176 on Nov. 18, 2016, now Pat. No. 11,312,864.

(30) Foreign Application Priority Data

| Nov. 21, 2015 | (DE) | 102015014956 |
|---|---|---|
| Nov. 29, 2015 | (DE) | 102015015549 |
| Nov. 29, 2015 | (DE) | 102015015550 |
| Feb. 5, 2016 | (DE) | 102016201801 |

(51) Int. Cl.

| *C09C 1/56* | (2006.01) |
|---|---|
| *B60C 1/00* | (2006.01) |
| *C08J 5/04* | (2006.01) |
| *C08K 3/04* | (2006.01) |
| *C08L 21/00* | (2006.01) |
| *C09C 1/48* | (2006.01) |
| *C09K 23/00* | (2022.01) |

(52) U.S. Cl.
CPC .............. *C09C 1/56* (2013.01); *B60C 1/0016* (2013.01); *B60C 1/0025* (2013.01); *C08J 5/042* (2013.01); *C08K 3/04* (2013.01); *C08L 21/00* (2013.01); *C09C 1/48* (2013.01); *C09K 23/002* (2022.01); *C01P 2006/12* (2013.01); *C01P 2006/19* (2013.01); *C08J 2400/22* (2013.01); *C08J 2400/24* (2013.01); *C08J 2400/26* (2013.01)

(58) Field of Classification Search
CPC ................................ C09C 1/48; C01P 2006/12
See application file for complete search history.

(56) References Cited

U.S. PATENT DOCUMENTS

| 4,477,611 | A | 10/1984 | Sperley |
|---|---|---|---|
| 4,598,105 | A | 7/1986 | Weber et al. |
| 5,192,361 | A | 3/1993 | Schilling |
| 6,172,154 | B1 | 1/2001 | Brown et al. |
| 6,391,274 | B1 * | 5/2002 | Vogler ...................... C09C 1/50 |
| | | | 524/495 |
| 7,064,171 | B1 | 6/2006 | Halasa et al. |
| 7,671,126 | B1 | 3/2010 | Sandstrom et al. |
| 9,512,376 | B2 | 12/2016 | Peus |
| 11,306,209 | B2 * | 4/2022 | Wittmann ............. B60C 1/0025 |
| 2002/0156177 | A1 * | 10/2002 | Freund ...................... C09C 1/50 |
| | | | 423/449.1 |
| 2004/0116574 | A1 | 6/2004 | Sandstrom |
| 2004/0248731 | A1 * | 12/2004 | Vogel .................... H01M 4/625 |
| | | | 502/185 |
| 2005/0031528 | A1 * | 2/2005 | Niedermeier ......... B60C 1/0016 |
| | | | 423/449.2 |
| 2005/0100502 | A1 * | 5/2005 | Krauss ................. C09D 11/324 |
| | | | 423/449.1 |

(Continued)

FOREIGN PATENT DOCUMENTS

| AT | 85234 | B | 11/1921 |
|---|---|---|---|
| CA | 522715 | A | 3/1956 |

(Continued)

OTHER PUBLICATIONS

Kalderis et al. (Solid Earth, 5, 477-483, 2014) (Year: 2014).*
Das et al. (Waste Management 38 (2015) 132-140). (Year: 2015).*
Peterson (Journal of Elastomers and Plastics 45(5), 487-497, 2012) (Year: 2012).*
Kang, Shimin , et al., "Hydrothermal Conversion of Lignin and Application Studies of Its Products", Chinese Doctoral Dissertations Full-text Database—Agricultural science and technology., Dec. 15, 2013, pp. 53, 54, 61, 63 and 64.

(Continued)

*Primary Examiner* — Liam J Heincer
(74) *Attorney, Agent, or Firm* — SERVILLA WHITNEY LLC

(57) ABSTRACT

The present invention relates to a particulate carbon material that can be produced from renewable raw materials, in particular from biomass containing lignin, comprising: a MC content that corresponds to that of the renewable raw materials, said content being preferably greater than 0.20 Bq/g carbon, especially preferably greater than 0.23 Bq/g carbon, but preferably less than 0.45 Bq/g carbon in each case; a carbon content in relation to the ash-free dry substance of between 60 ma. % and 80 ma. %; an STSA surface area of the primary particles of at least 5 m²/g and at most 200 m²/g; and an oil absorption value (OAN) of between 50 ml/100 g and 150 ml/100 g. The present invention also relates to a method for producing said carbon material and to the use thereof.

21 Claims, 6 Drawing Sheets

(56) References Cited

U.S. PATENT DOCUMENTS

| | | | |
|---|---|---|---|
| 2005/0249657 A1* | 11/2005 | Kutsovsky | C09C 1/50 423/449.1 |
| 2006/0264561 A1* | 11/2006 | Green | C09C 1/50 423/449.1 |
| 2007/0100058 A1 | 5/2007 | Noguchi et al. | |
| 2007/0151178 A1 | 7/2007 | Baikerikar et al. | |
| 2007/0187033 A1 | 8/2007 | Shumacher et al. | |
| 2007/0193669 A1 | 8/2007 | Giannini et al. | |
| 2008/0066839 A1 | 3/2008 | Sandstrom et al. | |
| 2008/0128065 A1 | 6/2008 | Sandstrom | |
| 2008/0159947 A1* | 7/2008 | Yurovskaya | C09C 1/48 423/449.1 |
| 2008/0269379 A1* | 10/2008 | Belmont | C09C 1/56 106/311 |
| 2009/0099281 A1 | 4/2009 | Sakurai et al. | |
| 2009/0163617 A1* | 6/2009 | Wong | B82Y 30/00 524/496 |
| 2010/0130639 A1 | 5/2010 | Viola et al. | |
| 2010/0204368 A1 | 8/2010 | Benko et al. | |
| 2010/0304141 A1 | 12/2010 | Kamegawa et al. | |
| 2011/0076608 A1* | 3/2011 | Bergemann | C09D 11/037 524/611 |
| 2011/0236816 A1* | 9/2011 | Stanyschofsky | C09C 1/54 423/449.1 |
| 2012/0083571 A1* | 4/2012 | Hasegawa | C09C 1/48 524/575.5 |
| 2012/0302664 A1 | 11/2012 | Kamada | |
| 2013/0046064 A1 | 2/2013 | Herd et al. | |
| 2013/0231423 A1* | 9/2013 | Rumpf | C09C 1/48 564/430 |
| 2013/0256113 A1 | 10/2013 | Tumiatti et al. | |
| 2013/0312472 A1 | 11/2013 | Brehmer et al. | |
| 2014/0013996 A1* | 1/2014 | Dikan | C08K 5/5317 106/478 |
| 2014/0116594 A1 | 5/2014 | Miyazaki | |
| 2014/0162873 A1 | 6/2014 | Gu | |
| 2014/0227325 A1* | 8/2014 | Naskar | B01J 20/3078 502/418 |
| 2014/0251179 A1* | 9/2014 | Liu | C09D 17/001 106/31.86 |
| 2014/0339467 A1 | 11/2014 | Elliot et al. | |
| 2015/0152255 A1 | 6/2015 | Mlayah et al. | |
| 2015/0175782 A1* | 6/2015 | Blume | C08K 13/00 523/156 |
| 2015/0183962 A1* | 7/2015 | Belmont | C09C 1/48 524/105 |
| 2015/0299436 A1* | 10/2015 | Shin | B60C 1/0016 524/495 |
| 2015/0321173 A1 | 11/2015 | Grönberg et al. | |
| 2016/0230099 A1* | 8/2016 | Hilli | C08H 6/00 |
| 2016/0251518 A1* | 9/2016 | Wampler | B60C 1/0016 524/575 |
| 2017/0058127 A1 | 3/2017 | Naduvile Veettil | |
| 2017/0226535 A1* | 8/2017 | Tudman | C01B 32/342 |
| 2017/0247255 A1* | 8/2017 | Wittmann | C01B 32/05 |
| 2017/0260397 A1* | 9/2017 | Vogler | C09C 1/50 |
| 2018/0334568 A1 | 11/2018 | Lahtinen et al. | |
| 2018/0340074 A1* | 11/2018 | Wittmann | C09C 1/48 |
| 2020/0056050 A1* | 2/2020 | Atanassova | H01M 4/625 |
| 2023/0287185 A1* | 9/2023 | Stücker | C08L 21/00 |
| 2024/0025747 A1* | 1/2024 | Wittmann | C01B 32/00 |

FOREIGN PATENT DOCUMENTS

| | | | |
|---|---|---|---|
| CA | 700368 A | 12/1964 | |
| CA | 818607 A | 7/1969 | |
| CA | 2342928 A1 | 3/2000 | |
| CA | 2781135 A1 | 5/2011 | |
| CA | 2920702 A1 | 2/2015 | |
| CA | 3002724 A1 | 5/2017 | |
| CN | 102212219 A | 10/2011 | |
| CN | 103951858 A | 7/2014 | |
| CN | 106243427 A | 12/2016 | |
| DE | 102007056170 A1 | 11/2008 | |
| DE | 2007022840 A1 | 12/2008 | |
| DE | 2008050966 A1 | 5/2009 | |
| DE | 2011113825 A1 | 3/2013 | |
| DE | 102015015549.0 | 11/2015 | |
| DE | 102014215807 B3 | 12/2015 | |
| DE | 102014215627 A1 | 2/2016 | |
| DE | 102016201801.9 | 2/2016 | |
| EP | 1233042 A2 | 8/2002 | |
| EP | 1457308 A1 | 9/2004 | |
| EP | 2130893 A2 | 12/2009 | |
| EP | 2223928 A1 | 9/2010 | |
| EP | 2305750 A1 | 4/2011 | |
| EP | 2479223 A1 | 7/2012 | |
| EP | 2484434 A1 | 8/2012 | |
| EP | 2671632 A2 | 12/2013 | |
| EP | 2937388 A1 | 10/2015 | |
| EP | 2796561 B1 | 7/2016 | |
| EP | 3053929 A1 | 8/2016 | |
| EP | 3059287 A1 | 8/2016 | |
| EP | 3243877 A1 | 11/2017 | |
| EP | 3243877 B1 | 3/2018 | |
| EP | 2681296 B1 | 4/2018 | |
| EP | 3682965 A1 | 7/2020 | |
| JP | 2005075856 A | 3/2005 | |
| JP | 2011006552 A | 1/2011 | |
| JP | 2014001379 A | 1/2014 | |
| KR | 20140102807 A | 8/2014 | |
| RU | 2417172 C2 | 4/2011 | |
| RU | 2442806 C2 | 2/2012 | |
| WO | 2005100502 A1 | 10/2005 | |
| WO | 2008095589 A1 | 8/2008 | |
| WO | 2009127727 A1 | 10/2009 | |
| WO | 2009145784 A1 | 12/2009 | |
| WO | 2010006881 A1 | 1/2010 | |
| WO | 2010043562 A1 | 4/2010 | |
| WO | 2010112230 A1 | 10/2010 | |
| WO | 2011001315 A1 | 1/2011 | |
| WO | 2011013161 A1 | 2/2011 | |
| WO | 2012000033 A1 | 1/2012 | |
| WO | 2012168502 A1 | 12/2012 | |
| WO | 2014016344 A1 | 1/2014 | |
| WO | 2014096544 A1 | 6/2014 | |
| WO | 2014122163 A1 | 8/2014 | |
| WO | 2014180753 A1 | 11/2014 | |
| WO | 2015018944 A1 | 2/2015 | |
| WO | 2015025076 A1 | 2/2015 | |
| WO | 2015056757 A1 | 4/2015 | |
| WO | 2015097196 A2 | 7/2015 | |
| WO | 2016001490 A1 | 1/2016 | |
| WO | 2016020383 A1 | 2/2016 | |
| WO | 2016207493 A1 | 12/2016 | |
| WO | 2017085278 A1 | 5/2017 | |
| WO | 2017109672 A1 | 6/2017 | |

OTHER PUBLICATIONS

Kang, Shimin , et al., "Hydrothermal Conversion of Lignin and Application Studies of Its Products", Chinese Doctoral Dissertations Full-text Database—Agricultural science and technology. English Machine Translation, Dec. 15, 2013, pp. 53, 54, 61, 63 and 64.

Sui, Zhaode , et al., "Light Stabilizer and Its Application Technology", Beijing: China Light Industry Press, p. 78, Jan. 2010.

Sui, Zhaode , et al., "Light Stabilizer and Its Application Technology", Beijing: China Light Industry Press, p. 78, Jan. 2010, English Translation.

"EP Office Action in Application No. 16809654.3 dated Mar. 25, 2020 English Machine Translation (11 pages)".

Orlov, V. Yu, et al., "Production and Use of Technical Carbon for Rubbers", Yaroslavl, Alexander Rutman, Nov. 1, 2002. English Machine Translation (5 pages).

ASTM D1765-10, standard classification system for carbon blacks used in rubber products 2010.

D 2414, Standard Test Method for Carbon Black Oil Absorption Noumber in ASTM International Feb. 2002.

Earliest priority document for EP3682965A1, application filed Nov. 21, 2015.

(56)         References Cited

OTHER PUBLICATIONS

Retrieved internet page concerning announcement of a new website for the Poznan Radiocarbon Laboratory (Internet Archive) Feb. 14, 2019.

Cao , et al., "Effects of Biomass Types and Carbonization Conditions on the Chemical Characteristics of Hydrochars", J. Agric. Food Chem, 2013, 61, 9401-9411.

De Wild, P.J. , et al., "Thermolysis of lignin for value-added products", Presented at XV Meeting of Humic Substances Society, Tenerife, Canary Islands, Spain, 27.6.-2.7.2010 2010.

Golnabi, H. , "Investigation of electrical conductivity of different water liquids and electrolyte solutions", Iranian Physical Journal, 3-2, 24-28 (2009); Sep. 20, 2009.

Hirvela, M. , "Hydrothermal carbonization in wood industry sidestreams", Master's thesis, Lappeenranta University of Technology, 2018.

Jindo, K. , et al., "Physical and chemical characterization of biochars derived from different agricultural residues", Biogeosciences, 11, 6613-6621, 2014.

Libra , et al., "Hydrothermal carbonization of biomass residuals: a comparative review of the chemistry, processes and applications of wet and dry pyrolysis", Biofuels (2011) 2(1), 89-124.

Nieto-Delgado, C. , et al., "Evolution of Raman signal during lignin pyrolysis and its correlation with the binding mechanism in anthracite briquettes", Fuel, vol. 298, Article 120816 (on-line version of manuscript) Aug. 15, 2021.

Nizamuddin , et al., "Hydrothermal carbonization of oil palm shell", Korean J. Chem. Eng. vol. 32, pp. 1789-1797, (2015), Published May 15, 2015.

Sutcu, H. , et al., "Characterization of Activated Carbons Produced from Oleaster Stones", Progress in Biomass and Bioenergy Production, Dr. Shahid Shaukat (Ed.), InTech, 2011 Jul. 27, 2011 (online).

Wang , et al., "Preparation of carbon black from rice husk by hydrolysis, carbonization and pyrolysis", Bioresource technology 102 (2011) 8220-8224.

Wikberg, H. , et al., Tappi Journal, vol. 14 (Mar. 2015), pp. 195-207.

Guy, L. , et al., "New Insights in the Dynamic Properties of Precipitated Silica Filled Rubber Using a New High Surface Silica", Raw Materials and Applications , 2009 particular relevance: pp. 383-384.

Hofmann, W. , "Rubber Technology Handbook", Dusseldorf, Spring, pp. 3 (1980).

Jiang, Guozhan , et al., "Effect of the temperature of the composition of lignin pyrolysis products", Energy Fuels, 2010, 24, 4470-4475.

Kaewsakul, W. , et al., "Optimization of Rubber Formulation for Silicareinforced Natural Rubber Compounds", Rubber Chemistry and Technology, vol. 86, No. 2, 2013, 17 pages.

Kang, Shimin , et al., "Characterization of Hydrochars Produced by Hydrothermal Carbonization of Lignin, Cellulose, d-Xylose, and Wood Meal", Ind. Eng. Chem. Res. 2012, 51, 26, 9023-9031.

Konecny, P. , et al., "Dynamic mechanical properties of filled styrene butadiene rubber compounds: comparison of tensile and shear data", Polym. Adv. Technol, 2007: 18:122-127.

Kostial, P. , et al., "The Chosen Aspects of Materials and Construction Influence on the Tire Safety in: Composites and Their Properties", Aug. 22, 2012 (DOI: 10.5772/48181), 34 pages.

Leister, G. , "Fahrzeugrader—Fahrzeugreifen", 2nd Ed., 2015, 175 pages.

Limper, Andreas , "Mixing of Rubber Compounds", Carl Hanser Verlag, 201 1 particular relevance: pp. 71-72.

Orlov, V. Lu., et al., "Production and Use of Technical Carbon for Rubbers", Yaroslavl, Alexander Rutman, Nov. 1, 2002.

Popa, V. I., et al., "Nanoparticles based on modified lignins with biocide properties", Cellulose Chemistry and Technology, vol. 45, Issue 3-4, pp. 221-226 (2011).

Ramsey, C.B. , "Bayesian Analysis of Radiocarbon Dates", Radiocarbon, vol. 51, No. 1,pp. 337-360 (2009).

Ramsey, C.B. , "Development of the Radiocarbon Calibration Program", Radiocarbon, vol. 43, No. 2A, pp. 355-363 (2003).

Ramsey, C.B. , et al., "Recent and Planned Developments of the Program OxCal", Radiocarbon, vol. 55, Issue 2, pp.720-730 (2013).

Reimer, P.J. , et al., "INTCAL 13 And MARINE13 Radiocarbon Age Calibration Curves 0-50,000 Years Cal BP", Radiocarbon, vol. 55, No. 4, pp. 1869-1887 (2013).

Ross, Kelly , et al., "Comparative analysis of pyrolysis products from a variety of herbaceous, Canadian crop residues", Wood Journal of Agricultural Sciences, 2011, 7(6), 763-776.

Rothemeier, F. , et al., "Rubber technology. Materials—Processing—Products", 3rd ed. Carl Hanser Verlag, pp. 1 (2013) (Abstract Only).

Sazanov, Yu. N., et al., "Thermochemistry of Lignin", Russian J. of Appl. Chemistry, 2010, vol. 83, No. 2, 175-194.

Stuiver, M. , et al., "Discussion. Reporting of 14 C Data", Radiocarbon, vol. 19, No. 3, pp. 355-363 (1977).

Teh, Swe Jyan, et al., "ZnCl2/NaCl-Catalysed Hydrothermal Carbonization of Glucose and Oil Palm Shell Fiber", Nanoscience and Nanotechnology Letters vol. 7, 611-615, 2015.

Wikberg, Hanne , et al., "Structural and morphological changes in Kraft lignin during hydrothermal carbonization", 2015, ACS Sustainable Chem. Eng.,3, 2737-2745.

Zhang, Bo , et al., "Reaction Kinetics of the Hydrothermal Treatment of Lignin", Appl. Biochem. Biotechnol., Mar. 2008, v. 147, pp. 119-131.

Zhao, J. , et al., "Thermal degradation of softwood lignin and hardwood lignin by TGFTIR and Py-GC/MS", Polymer Degradation and Stability, 2014, 108, 133-138.

Analysis and reworking of experiments in documents "Experimental Report: Comparative Study of NR/BR Compounds with Carbon Black, Silica or HTC Lignin Fillers" [D1], "Technical Report F03243" [D2] and "Experimental Report NR/SBR" [D3].

ASTM D6556-10, Standard Test Method for Carbon Black-Total and External Surface Area by Nitrogen Adsorption [downloaded May 4, 2021], 5 pages.

ASTM D6556-14, Standard Test Method for Carbon Black—Total and External Surface Area by Nitrogen Adsorption [downloaded May 4, 2021], 5 pages.

Challenge Tech handmade tires catalogue (published 2015), 2 pages.

Continental Solid Tires catalogue (published 2018), 24 pages.

Definition of "Reifen" of Rompp Lexikon Chemie, 10th Edition, 1998, 3 pages.

Experimental Report NR/SBR, 1 page.

Experimental report to the EPO in opposition proceedings against EP 3243877 B1, Apr. 26, 2021, 3 pages.

Experimental study report (Nokian Renkaat Oyj), May 15, 2019, 8 pages.

FFD im Dialog (2012), 65 pages.

ISO 34-1:1994, 16 pages.

ISO 37:1994, 16 pages.

ISO 37:2005, 32 pages.

Michelin X Tweel Airless Radial Tire Family catalogue (published 2018), 8 pages.

Product information Ultrasil 360, Feb. 2018 (Evonik), 2 pages.

Supplementary experimental report to EPO (Nokian Renkaat 20.02. 2020), 5 pages.

Technical Report F03243, 7 pages.

"ATSM International "Standard Test Method for Carbon Black—Total and External Surface Area by Nitrogen Adsorption"", Designation: D6556-09, Dec. 15, 2019.

"Dynamic Mechanical Properties of Passenger and Light Truck Tire Treads", NHTSA, Feb. 2010, 28 pages.

"EP Office Action in Application No. 16809654.3 dated Mar. 25, 2020".

"European Search Report in Application No. 20160400.6 dated Jun. 23, 2020".

"Experimental Report: Comparative Study of NR/BR Compounds with Carbon Black, Silica or HTC Lignin Fillers", 6 pages.

"Expert Opinion to the EPO by Postdoctoral Research Fellow Minna Pokelispaa", Apr. 14, 2021, 6 pages.

"Final Office Action in U.S. Appl. No. 15/777,906, mailed on Sep. 14, 2020, 22 pages".

(56) References Cited

OTHER PUBLICATIONS

"How much does a tyre weigh?", (1 Aug. 8, 2015; Author: OPONEO. CO.UK, Adam Winter; http://www.oponeo.co. uk:80/tyre-article/how-muchdoes-a-tyre-weigh—capture from web.archive.org dated May 5, 2016).

"Hydroisotop GmbH, ,Nachwachsende Rohstoffe, Sekundarbrennstoffe, Apr. 13, 2018".

"Hydrothermal Carbonization—1. Influence of Lignin in Lignocelluloses", Dec. 2011, Chemical Engineering & Technology 34(12) (DOI:10.1002/ceat.201100487).

"IN Office Action in Application No. 202038015678 dated Jan. 19, 2021".

"IPC vol. 1 Sec B, 8th. ed.", article WIPO, International Patent Classification (core level), 2006 particular relevance: pp. 106-108.

"Lignin Filler for Tires (1957), 5 pages".

"Non-Final Office Action in U.S. Appl. No. 15/777,906, mailed on Apr. 28, 2020, 20 pages".

"Non-Final Office Action in U.S. Appl. No. 15/777,906, mailed on May 25, 2021, 22 pages".

"Non-Final Office Action in U.S. Appl. No. 17/468,246, mailed on Nov. 9, 2021, 32 pages".

"PCT International Search Report in PCT/EP2016/078176 dated Apr. 4, 2017", 6 pages.

"PCT Written Opinion in PCT/EP2016/078176 dated Apr. 4, 2017", 10 pages.

"Popular mechanics", 1914, vol. 22, No. 3, p. 402.

"Product information Ultrasil VN 3, Sep. 2018 (Evonik), 2 pages".

"RU Office Action in Application No. 2018121627 dated Mar. 2, 2020".

"The Pneumatic Tire", Feb. 2006, available from www.nhtsa.gov, 33 pages.

"www.wikipedia.org definition of "Tire Manufacturing" [downloaded Sep. 26, 2018], 7 pages".

"www.wikipedia.org definition of "Tire" [downloaded Sep. 26, 2018], 15 pages".

Brebu, Mihai , et al., "Thermal Degradation of Lignin—A Review", 2010, Cellulose Chern. Technol., 44(9), 353-363.

Brock, F. , et al., "Current Pretreatment Methods for AMS Radiocarbon Dating at the Oxford Radiocarbon Accelerator Unit (ORAU)", Radiocarbon, vol. 52, No. 1, pp. 103-112 (2010).

Chen, Xue , et al., "Effect of hydrothermal pretreatment on the structural changes of alkaline ethanol lignin from wheat straw", 2016, Scientific Reports 6:39354, DOI:1 0.1 038/srep39354, 1-9.

Chen, Xue , et al., "Effect of hydrothermal pretreatment on the structural changes of alkaline ethanol lignin from wheat straw", Scientific Reports, published Dec. 16, 2016, pp. 1-9, Springer Nature.

Clark, Samuel K., "Mechanics of Pneumatic Tires", 1971 , National Bureau of Standards Monograph 122, p. 360.

Czernik, J. , et al., "Preparation of Graphite Targets in the Gliwice Radiocarbon Laboratory for AMS 14C Dating", Radiocarbon, vol. 43, No. 2A, pp. 283-291 (2001).

Forrest, M.J. , "Rapra Review Reports, Report 139, Rubber Analysis—Polymers, Compounds and Products", 158 pages, vol. 12 issue No. 7.

Frigerio, Paola , "Biopolymers in elastomers: Lignins as biofiller for tyre compound", Jan. 2017, Ph.D thesis, University of Milano Bicocca, 146 pages.

Goslar, T. , et al., "Low-energy 14C AMS in Pozna Radiocarbon Laboratory, Poland", Nuclear Instruments and Methods in Physics Research Section B: BeamInteractions with Materials and Atoms, vol. 223-224, pp. 5-11 (2004) (Abstract Only).

Xiaoyue, Gao , et al., "English Translation of Technical research and mechanism on the preparation of carbon materials from cellulose", New Chemical Materials, vol. 40 No. 8, pp. 119-122.

Xiaoyue, Gao , et al., "Technical research and mechanism on the preparation of carbon materials from cellulose", New Chemical Materials, vol. 40 No. 8, pp. 119-122.

Liang, et al., "Effect of Solution pH on the Carbon Microsphere Synthesized by Hydrothermal Carbonization", Procedia Environmental Sciences 11 (2011) 1322-1327.

Zhao, et al., "Carbon spheres obtained via citric acid catalysed hydrothermal carbonisation of cellulose", Materials Research Innovations 2013, 17(7), 546-551.

Machine Translation of JP2014001379A.

Liu, et al., "Preparation and characterization of fuel pellets from woody biomass, agro-residues and their corresponding hydrochars", Applied Energy 113 (2014) 1315-1322.

* cited by examiner

PARTICULATE CARBON MATERIAL PRODUCIBLE FROM RENEWABLE RAW MATERIALS AND METHOD FOR ITS PRODUCTION

CROSS-REFERENCE TO RELATED APPLICATIONS

This application claims priority under 35 U.S.C. § 120 to U.S. application Ser. Nos. 17/468,246 and 17/468,253, each filed on Sep. 7, 2021, each of which claims priority to U.S. application Ser. No. 16/847,523, filed on Apr. 13, 2020, which claims priority to U.S. application Ser. No. 15/777, 906, filed on May 21, 2018, which is the National Stage entry of PCT/EP2016/078176, filed on Nov. 18, 2016, which claims priority to DE Application Serial Nos. 102016201801.9, filed Feb. 5, 2016, 102015015550.4, filed Nov. 29, 2015, 102015015549.0, filed Nov. 29, 2015, and 102015014956.3, filed Nov. 21, 2015, the disclosures of which are incorporated herein by reference in their entireties.

TECHNICAL FIELD

The present invention relates to a particulate carbon material according to claim 1 and to a method for its production according to claim 9 and to the use of the material according to claim 19 in polymer mixtures.

DESCRIPTION

There is a wide range of applications for particulate carbon material. One application is the use as filler for polymers such as elastomers, thermoplastics and thermosets. In the production of rubber articles from elastomers fillers are used in order to influence the rubber-technological properties of the cross-linked rubber articles, e.g. measured as tensile strength, hardness, rigidity or tear strength. Furthermore, the product properties such as for example the rolling resistance, abrasion and wet grip performance of vehicle tires thereby are adjusted. Influencing the rubber-technological properties by a filler also is referred to as reinforcement.

The fillers most widely used at present include carbon black and silica. Carbon black mostly is produced by the pyrolysis of natural gas, petroleum parts and/or coal-based oils, wherein in dependence on the carbon black quality considerable amounts of carbon dioxide are generated during the production. Precipitated silica is produced from water glass, wherein during the production of water glass large amounts of carbon dioxide also are obtained.

With the shortage of fossil carbon resources (cf. petroleum- and coal-based oils as carbon black raw material), the saving of chemicals (see sulfuric acid in the precipitation of silica), but above all with the avoidance of carbon dioxide emissions from fossil sources (see decomposition of carbonate in the production of water glass; see combustion of oil or gas in the precombustion chamber of carbon black reactors as well as the partial combustion of the carbon black raw material in the formation of carbon black) there is an increasing demand for the production of industrial products on the basis of renewable raw materials. In renewable raw materials all the carbon originates from atmospheric carbon dioxide. With an energetic utilization of renewable raw materials the carbon dioxide balance hence is largely neutral. With a material utilization of renewable raw materials no fossil carbon is released during the production, and even atmospheric carbon is bound in the carbonaceous material—at least for the period of use of the respective products.

In the following, there is described a particulate carbon material on the basis of renewable raw materials to be used as a filler, which has surprisingly good properties in use as a filler in elastomers as compared to the classically produced fillers carbon black and silica.

In the following, the meaning of terms used here is described:

A filler is a particulate solid that is added to an elastomer, thermoplastic or thermoset. Depending on the property of the filler, e.g. when added to elastomers, the rubber-technological properties of a cross-linked rubber mixture (e.g. cross-linked by vulcanization) are influenced to varying degrees by adding the filler, in general together with further additives, before cross-linking.

Silica is a typical filler. Silica in essence means precipitated silica, which chiefly is used in rubber articles. In addition, there also is pyrogenic silica.

Carbon black is another typical filler. This always means industrial carbon black, i.e. a specifically technically produced carbon black with defined properties. Carbon black chiefly is produced by incomplete combustion or pyrolysis. Here, carbon black does not mean any by-products of a combustion like in the case of diesel soot or chimney soot.

The reinforcing effect of carbon black and/or silica greatly correlates with the primary particle size of the filler. The primary particle size is directly related to the specific surface area.

Against this background, carbon blacks with small surface area are referred to as inactive carbon blacks, carbon blacks with medium surface area are referred to as semi-active carbon blacks, and carbon blacks with large surface area are referred to as active carbon blacks, wherein activity here means the degree of the reinforcing effect of the respective carbon blacks in the rubber. See also ASTM D 1765. Typically, inactive carbon blacks have BET surface areas $<30$ m$^2$/g, semi-active carbon blacks 30-70 m$^2$/g, and active carbon blacks 90 to $>150$ m$^2$/g. The importance of the surface area as a guidance parameter also becomes clear from the fact that the first digit of the ASTM carbon blacks reflects the particle size and the surface area, respectively. In the case of silica, this differentiation is less pronounced. Silica with a distinct reinforcing effect typically has a BET surface area $>100$ m$^2$/g. In the following, filler means a product that achieves at least the performance of an inactive carbon black. A performance that is at least comparable to that of an inactive carbon black subsequently also is referred to as reinforcing effect. A typical inactive carbon black is N990.

The particle surface is composed of the outer and the inner surface. The associated measurement quantity is the specific surface area of the particulate material. The specific surface area can be measured as the outer surface area by means of statistical thickness surface area, for short STSA, or as total surface area comprising outer and inner surface area by means of nitrogen surface area according to Brunauer, Emmett and Teller, for short BET. The difference between inner and outer surface area substantially results from the porosity of the material. Beside the surface surrounding the particles, the inner surface area also relates to the surface present in pores. A coarsely divided material, which has a comparatively small outer (i.e. STSA) surface area, nevertheless can have a large total (i.e. BET) surface area (comprising outer and inner surface area), when it is highly porous.

To describe the fineness of a material with reference to values of the specific surface area, only the STSA surface area strictly speaking is to be employed. Conversely, the difference "BET surface area minus STSA surface area" is a measure for the porosity of finely divided materials, as it represents the surface area of the pores. The smaller the difference is, the less porous the material. In the case of non-porous materials, BET also very well describes the fineness.

The determination of the BET surface area and the STSA surface area is effected corresponding to the standard ASTM D 6556-14. In the present invention, in contrast to this standard, the sample preparation/outgassing for the STSA and BET measurements is effected at 150° C.

The methods and their significance likewise are described in "Kautschuktechnologie" (Fritz Röthemeier, Franz Sommer, 3rd edition, Carl Hanser Verlag München 2013) on page 289 with reference to the example of a classical carbon black. The most important method for determining the specific surface area is the measurement of the nitrogen adsorption according to Brunauer, Emmett and Teller (BET method). A sample of the carbon black is first heated in a vacuum in order to remove the substances adsorbed on the surface. After cooling, the sample is exposed to nitrogen at boiling temperature (77 K), and the adsorbed volume as well as the associated equilibrium vapor pressure are determined. At low pressures, a monomolecular layer first is formed, to which further layers are attached with increasing pressure. The specific surface area can be determined by evaluating the adsorption isotherm according to the BET method with a nitrogen partial pressure of 0.1 to 0.3. For routine determinations single-point measurements are sufficient.

The determination of the surface area by means of $N_2$ adsorption provides a larger surface area for microporous carbon blacks, as the nitrogen molecules can also penetrate the pores. This effect can be avoided by using surface-active substances that are larger than the pores (CTAB method) or by determining the $N_2$ adsorption at higher partial pressures (0.2 to 0.5) and a further evaluation (STSA method).

STSA method (Statistical Thickness Surface Area): The evaluation makes use of the same measurement data as in the BET method, but the measurement is made at higher partial pressures (0.2 to 0.5). The STSA method is based on the so-called t-plot evaluation method according to de Boer, later on modified by Magee. It is assumed here that the adsorption is locally different in various stack heights, which then have a statistical thickness. The STSA surface area likewise is indicated in $m^2/g$ and is a measure for the "outer" surface area of a carbon black particle, but above all it is a measure for the rubber-active surface area.

When comparing the performance of carbon black or silica in cross-linked rubber articles it is expedient in view of the known dependence between specific surface area and performance to compare fillers with a similar specific surface area. Similar surface area here and in the following means that the BET values of non-porous materials or the STSA values are apart by not more than approximately 10-20 $m^2/g$.

Carbon black and silica are built up of primary particles. These geometric units, which do not exist in isolated form, but are visible in pictorial representations, are intergrown to form aggregates, wherein the intergrowth is effected by strong chemical bonds. Aggregates in addition can be clustered to form agglomerates, wherein the connection of several aggregates to agglomerates is effected by weak forces. Agglomerates can be destroyed by dispersion. The degree of the aggregate formation is described in obsolete form by DBP absorption or more recently by oil absorption. For more details see ASTM D 2414. Reference also is made to the oil absorption number with the abbreviation OAN. A high value of the DBP or oil absorption designates a material with strongly branched aggregates. In carbon black above all the so-called structure has a direct influence on its reinforcing effect.

The performance of carbon black or silica in rubber applications generally is determined by measuring rubber-technological characteristic quantities. Rubber-technological characteristic quantities describe certain properties of a rubber mixture in the cross-linked, for example vulcanized condition. In so far, rubber articles in this document are understood to be the finished articles made of rubber after their cross-linkage and vulcanization, respectively. In the present document, these finished rubber articles also are referred to as rubber parts, molded articles, articles made of elastomer material or rubber product. From the wide variety of rubber parts in various fields of application a multitude of different quantities is obtained to describe rubber parts. Depending on the field of application, values of a quantity referred to as positive can also be assessed as negative elsewhere. What is primarily used as rubber-technological characteristic quantities is the tensile strength (ASTM D 412, DIN 53504), tear strength (DIN 53455) as well as the stress values at a strain of 50%, 100%, 200% and 300% (DIN 53504), hereinafter referred to as so-called modulus 50%, modulus 100%, modulus 200% and modulus 300%, respectively. Furthermore, the hardness (ASTM D 2240) for example can play a role. For these quantities, however, values that are high, but not too high, are regarded as positive.

As a further rubber-technological characteristic value, the loss factor tan delta is used as a quotient from the loss modulus E" and the storage modulus E' of the elastomer material. A distinction is made between the value of tan delta in a high temperature range, in particular the tan delta at 60° C., and the tan delta in the lower temperature range, in particular the tan delta at 0° C. While the tan delta at 60° C. suggests the rolling friction of a tire, the tan delta at 0° C. is used to assess the wet grip of a tire. For the tan delta at 60° C. low values are preferred in this connection, and for the tan delta at 0° C. high values are preferred. The tan delta values are determined in connection with a dynamic mechanical analysis (temperature sweep). In the case described here, the dynamic mechanical analysis (DMA) is carried out with prism-shaped molded pieces of the dimensions 2×10×35 mm for the temperature variation on an Eplexor 150N Dynamic Mechanical Thermal Spectrometer.

Untreated silica is a filler with polar functional groups, which in sulfur-crosslinked systems can disturb the cross-linkage. The disturbance of the sulfur cross-linkage for example can be based on the adsorption of vulcanization aids on the polar functional groups of the filler surface. In addition, for example, the different surface energies of polymer and filler can prevent a good dispersion of the filler in the polymer and when reheating of the mixture (e.g. during the vulcanization) can lead to an undesired re-agglomeration of the filler particles dispersed already (so-called filler flocculation). This is the starting point for the addition of reagents to the silica. In the simplest case the polar groups of silica are reacted with suitable basic compounds, whereby these groups are deactivated or masked. The silica as such in this way as a whole is activated in its function as reinforcing filler, i.e. the surface chemistry of silica is adapted to the surface chemistry of the polymer due to this activation or masking. See also: Fritz Röthemeier, Franz Sommer, 3rd edition, Carl Hanser Verlag München 2013 on pages 301-302.

To improve the rubber-technological properties, silica generally is used with coupling reagents. Coupling reagents are bifunctional compounds that bind to silica on the one hand and to rubber on the other hand and thus can produce a connection between the silica and the rubber. This is particularly important, as silica and rubber per se are chemically incompatible with each other. A typical coupling reagent is bis(triethoxypropylsilyl)tetrasulfide in use of silica in rubber.

In the plastics application adhesion promoters are used, which likewise provide a connection between the polymer and a further component, which can be another polymer or a filler. In the present document coupling reagent also is understood to be an adhesion promoter.

In the field of powder characterization the grain size or the grain size distribution often is indicated as well. The same chiefly is determined by laser diffraction or sieve analysis. In general, it is either indicated what percentage the number (Q0 distribution) or the volume (Q3 distribution) of particles of a particular geometric expansion has in the total amount of particles. The indication usually is made in μm. The grain size refers to the size of the particle present in separate form under the concrete conditions. It depends on the dispersion medium and the dispersion quality. The grain size does not distinguish between particles as a result of macroscopic caking for example by foreign substances, particles as a result of microscopic agglomeration due to insufficient dispersion effort, or particles in the form of isolated aggregates or primary particles. It indicates the expansion of a body delimited to the outside, even if the same possibly consists of several connected parts. By means of the material density (raw density) the mass distribution can be calculated from the volume distribution.

The morphology of fillers can be fibrous, platelet-shaped or spherical. As a distinction criterion the length-to-diameter ratio can be used. The expansions in various directions in space for this purpose are determined for example by means of electron microscopic measurements (TEM, REM). Often, reference also is made to the aspect ratio, the quotient of largest and smallest expansion. It can be indicated both in the form x:y and in the form of the calculated quotient. As calculated quotient, a sphere hence would have an aspect ratio of 1, ellipsoid structures of approximately 1.5 to 2, and fiber-like structures more than 10.

Conventional carbon black, which is produced from raw materials of fossil origin, i.e. on the basis of coal tar, natural gas or petroleum, in the following is referred to as classical carbon black. In contrast thereto reference is made to biogenic carbon black when the carbon black has been produced from renewable raw materials.

Raw materials of fossil origin above all are all substances derived from petroleum, such as distillates, distillation residues or petroleum components treated by cracking processes. The fossil raw materials likewise include all products obtained during the distillation, coking or liquefaction of lignite, hard coal or anthracite. Natural gas also is a fossil raw material. All fossil carbon sources have in common that their $^{14}$C content lies below that of renewable raw materials, as they no longer participate In the steady exchange of isotopes.

Renewable raw materials on the other hand are all products derived from the direct utilization of plants or animals. When thinking of the carbon black production process, this can be primarily vegetable oils or animal fats. In a broader sense and hence in the sense of this document, this includes any biomass.

Biomass includes all organic substances accessible from the utilization of plants or animals or obtained as wastes of this utilization; including secondary products and wastes produced or separated therefrom. Without being able to make a restriction here, typical forms of biomass include wood, straw, sugar, starch, vegetable oil, leaves, shells, bagasse, empty fruit bunches, fermentation residues, green cuttings or organic municipal waste. It is usual to designate organic material that has a shorter regeneration time than peat as biomass. Especially, this also includes wastes from the industrial use of plants. For example, in the pulp industry large amounts of wood are processed, in which lignin-containing wastes such as black liquor are obtained. All biomasses have in common that their $^{14}$C content lies above that of fossil raw materials, as they participate in the steady exchange of isotopes.

One type of biomass is lignin, which is obtained in some wood processing processes. Lignin is a naturally occurring polymer that primarily can be derived from the fundamental building blocks coumaryl, coniferyl and sinapyl alcohol. Depending on the process of wood processing, it is obtained as large amounts of KRAFT lignin, generally dissolved in black liquor, hydrolysis lignin or lignin sulfonate. Depending on the pH value in the respective processing process, the hydrogen atoms in the hydroxyl groups typical for lignin can proportionately be replaced by metal cations. Strictly speaking, the lignin sulfonate already is a chemical derivative of lignin, as it has additional sulfonate groups inserted during processing.

HTC is an abbreviation for hydrothermal carbonization. This is the treatment of a substance in aqueous phase under pressure-sealed conditions and at elevated temperature. Due to the elevated pressure it is possible to carry out reactions in liquid water, in which the temperature is far above 100° C., i.e. above the boiling point of water at normal pressure.

According to the prior art, fillers with a reinforcing effect chiefly are used to improve the rubber-technological properties of rubber articles. The two fillers most widely used for rubber applications are carbon black and silica. Carbon black almost exclusively is obtained from fossil raw materials. As the product according to the invention is a particulate carbon material usable e.g. as filler, which is obtained from renewable raw materials, the classical carbon blacks obtained from fossil raw materials do not belong to the prior art. Silica is a filler that is obtained from inorganic silicon compounds. Therefore, silicas likewise do not belong to the prior art.

A subject of research activities is the development of alternative fillers from renewable raw materials. The key aim pursued by the vast majority of these development efforts is to reproduce the properties of carbon black in the best possible way by refining renewable raw materials. This relates in particular to the carbon content, which is generally adjusted to more than 90%, but also to the fraction of graphitic carbon. The materials thus produced therefore are also referred to as bio-based carbon black. The parallel aim mostly is to provide a filler from renewable raw materials, which at least partly can substitute the classical carbon blacks. Furthermore, there are development efforts that aim at directly using the renewable raw materials as a filler, possibly after a purification, fractionation or comminution.

From WO 2010/043562 A1 it is known for example that carbon black also can be produced from renewable raw materials. As a filler with especially narrower aggregate size distribution the disclosed carbon black is said to above all have an improved modulus in rubber applications. In terms of their fundamental properties the carbon blacks characterized in WO 2010/043562 A1 lie within the range of the classical carbon blacks N220 and N375. The carbon black described here is produced by the classical furnace process, wherein natural gas is used in a precombustion chamber and fossil carbon is released. The carbon black obtained has a sulfur content of max. 2.5%, a content of volatile components according to DIN 53552 of max. 2.5%, and hence roughly a carbon content of more than 95% carbon.

WO 2014/096544 A1 claims a carbon product that is formed of porous carbon particles with a surface area of more than 500 $m^2$/g and an average pore volume of less than 1 ml/g, which in turn consist of primary particles, such as aggregates, that have a particle size of less than 250 nm. The carbon product is obtained from the hydrothermal carbonization of biomaterial that has more than 40% carbon based on the dry weight. Starting substances include lignin, tannin and betulin, hydrolysis lignin, products from the manufacture of paper, plates, biofuel or brewing products. The carbon content of the products described in the examples lies between 77.31 and 86.44% carbon. The strong carbonization of the material indicated in the examples means that other elements such as above all oxygen and hydrogen must be depleted. This necessarily leads to the disadvantage that the surface chemistry of the material depletes, i.e. there are less functional groups on the surface. The reduced number of surface groups has a disadvantageous effect on possible binding mechanisms to the polymer.

It is also known to directly use renewable raw materials such as lignin or lignin derivatives both without and with coupling reagents in rubber mixtures in order to influence the rubber-technological properties in the cross-linked condition.

For example, DE 10 2008 050 966 A1 describes a rubber mixture that contains a lignin derivative, more especially a lignin sulfonic acid derivative, up to alkali or alkaline earth salts of lignin sulfonic acid. The rubber mixture produced by using this lignin sulfonic acid derivative in addition can also contain carbon black or siliceous earth. The application also claims a tire made of the aforementioned rubber mixture. As is shown by the examples disclosed in DE 10 2008 050 966 A1, it is disadvantageous that the lignin derivatives always are used beside 40 phr carbon black or 80 phr siliceous earth/5 phr carbon black. The term siliceous earth in this document is used for silica. Hence, there is only achieved an improvement of the rubber-technological characteristic quantities in combination with the classical fillers.

When using renewable raw materials in rubber mixtures with the aid of coupling reagents, reference is made in particular to the expertise in the use of silica.

Of silica it is known in principle that in sulfur-crosslinked systems fillers with polar functional groups, such as e.g. untreated silica, disturb the cross-linkage. At the same time it is known that this disturbance can be mitigated by adding suitable reagents such as amines or glycols. The functional groups are blocked or masked. See also: Fritz Röthemeier, Franz Sommer, 3rd edition, Carl Hanser Verlag München 2013 on pages 301-302.

As regards the reinforcement with silica it is known that the effect of silica can be improved considerably by coupling reagents. There are used functional alkoxy silanes that on the one hand can bind to silica on mixing with the alkoxy silane group by forming an Si—O—Si bond and later on bind to the rubber polymer with a further function during the vulcanization, possibly with the participation of added sulfur. Suitable reinforcing bright fillers include silica and silicates. By treating the silica with silanes, the mechanical properties and the processing properties are substantially improved (see Fritz Röthemeier, Franz Sommer: Kautschuktechnologie, 3rd edition, Carl Hanser Verlag München 2013, pages 112-113, chapter 2.5.4.3 Fillers).

Similarly, uses of silane as coupling reagent in renewable raw materials, which will be used as fillers, are known.

EP 2 223 928 A1 describes a functionalized lignin, wherein groups contained in the lignin react with functionalizing agents and these reagents can be anhydrides, esters and silanes. Furthermore, there is disclosed a rubber mixture that contains functionalized lignin as filler, possibly mixed with classical carbon black or silica, and optionally a coupling reagent for the functionalized lignin or for the silica.

It is also known to produce finely divided materials (which would be usable as fillers) by hydrothermal carbonization (HTC).

By way of example reference is made to WO 2014/122163 A1, which describes a method for producing a carbon-enriched biomass material, the obtained biomass material and its use. The feedstock lignocellulose material is treated at elevated temperature, preferably at maximally 120-130° C., and partially oxidizing conditions, i.e. in the sub-stoichiometric presence of oxygen, preferably in a range of 0.15-0.45 mol/kg of dry lignocellulose material, and after opening the reactor solid products optionally are separated from the reaction mixture. The feedstock has a moisture content between 10% and 70% and a size between 0.2 and 100 mm. The applied pressure lies between 1 and 100 bar, absolute. As reaction time, 2-500 min are indicated. There is preferably used 0.1-1 kg of water or steam/kg of lignocellulose. The carbon concentration is increased by 8-25%. The obtained material contains a maximum of 45-60% carbon, beside 5-8% hydrogen and 35-50% oxygen. As use, merely the combustion is indicated, especially in the ground condition for dust firing.

Furthermore, there is known a method for obtaining carbonized lignin with a defined grain size distribution from a liquid containing lignin, wherein the liquid containing lignin is subjected to a hydrothermal carbonization, whereby the lignin is transferred into a carbonized lignin, and the carbonized lignin is separated from the liquid containing the carbonized lignin, the liquid containing lignin is subjected to a hydrothermal carbonization at temperatures in the range from about 150° C. to about 280° C., and the grain size distribution of the carbonized lignin is adjusted by adapting the $H^+$ ion concentration in the liquid containing lignin before and/or during the hydrothermal carbonization. Thus, it is known that by adjusting the $H^+$ ion concentration of a liquid containing lignin, the distribution of the grain size of the obtained product, i.e. the size of the agglomerates, can be influenced.

It is the object of the invention to provide a particulate carbon material from renewable raw materials usable for example as a filler, which for example when used in rubber mixtures after their cross-linkage at rubber technological characteristic quantities shows a comparable performance as a classical carbon black similar in terms of the BET/STSA surface area. In addition, it is the object of the invention to provide an efficient method with respect to the use of energy and adjuvants, by means of which the material according to the invention can be produced.

The object is solved by a particulate carbon material with the features of claim 1 and by a method for producing the same with the features of claim 9.

Correspondingly, there is provided a particulate carbon material producible from renewable raw materials, in particular from lignin-containing biomass, with the following features:

a $^{14}$C content corresponding to that of renewable raw materials, preferably greater than 0.20 Bq/g of carbon, in particular preferably greater than 0.23 Bq/g of carbon, preferably however each less than 0.45 Bq/g of carbon;

a carbon content based on the ash-free dry substance between 60 wt-% and 80 wt-%;

an STSA surface area of at least 5 m²/g and maximally 200 m²/g; and an oil absorption number (OAN) between 50 ml/100 g and 150 ml/100 g.

As mentioned above, lignin-containing biomass and here in particular lignin-containing biomass with a content of Klason lignin of more than 80% preferably is used as renewable raw material (to determine the lignin content the Klason method is employed, in which the polysaccharides are decomposed by a two-stage acid hydrolysis and the remaining lignin residue subsequently is weighed as Klason lignin). Lignin is obtained as a by-product of fractionation processes of woody biomass. During the fractionation processes, the lignin typically either is dissolved and then separated from the non-soluble components of the woody biomass (e.g. KRAFT process) or the woody biomass is depolymerized such that the lignin chiefly remains as a solid (e.g. hydrolysis process). Depending on the type of fractionation process, the lignin accordingly either is present dissolved in a liquid containing lignin, for example black liquor, or as a liquid generally dewatered mechanically. When the lignin is present dissolved in a liquid containing the lignin, the lignin can be precipitated from the same in general for example by using acids or acidically acting gases and be obtained as a mechanically dewatered solid (see for example the LignoBoost process).

The $^{14}$C content, which corresponds to that of renewable raw materials, distinguishes the present particulate carbon material, which can be used e.g. as a filler in elastomers, thermoplastics or thermosets, from classical carbon black that is obtained on the basis of fossil raw materials. In the present case, the particulate carbon material has a $^{14}$C content greater than 0.20 Bq/g of carbon, in particular preferably greater than 0.23 Bq/g of carbon, preferably however each less than 0.45 Bq/g of carbon.

The $^{14}$C content in biomass grown in the year 1950, i.e. at the beginning of the extensive nuclear weapon tests of mankind, was about 0.226 Bq/g of carbon. During the time of the nuclear weapon tests it grew up to 0.42 Bq/g of carbon and presently again approximately returns to the original level. In 2009, 0.238 Bq/g of carbon were measured. To delimit the carbon material according to the invention against materials with artificially enriched $^{14}$C content, the $^{14}$C content in the carbon material according to the invention hence is at most 0.45 Bq/g of carbon.

The carbon content based on the ash-free dry substance of more than 60 wt-% and less than 80 wt-%, preferably of more than 65 wt-% and less than 75 wt-%, more preferably of more than 68 wt-% and less than 74 wt-%, in addition preferably of more than 70 wt-% and less than 73 wt-% (carbon content by elemental analysis according to DIN 51732; ash content according to DIN 51719 at 815° C.) distinguishes the present particulate carbon material usable as filler from renewable raw materials directly used as filler such as wood flour, etc., which typically have a lower carbon content. Furthermore, the carbon content based on the ash-free dry substance of more than 60 wt-% and less than 80 wt-% distinguishes the present particulate carbon material from products produced from renewable raw materials for example by fractionation, extraction, distillation or crystallization, such as sugar, starch, cellulose, etc., which typically have a lower carbon content based on the ash-free dry substance of 40 wt-% to 50 wt-%. Furthermore, the present particulate carbon material in its preferred embodiment differs from lignin that has been separated from biomass by means of a KRAFT process, which typically has a carbon content based on the ash-free dry substance of 65 wt-%.

The carbon content based on the ash-free dry substance of more than 60 wt-% and less than 80 wt-% also distinguishes the present particulate carbon material from classical carbon black that has been produced by the usual carbon black production processes or the variants of the bio-based carbon black, which are produced both by the usual carbon black production methods and also for example by pyrolysis, partial oxidation, carbonization or similar methods, which typically have a higher carbon content based on the ash-free dry substance of about 95% and more. Also in the case of highly oxidized carbon blacks with a content of volatile components at 950° C. according to DIN 53552 of 20% and in addition 2.5% sulfur, the carbon content based on the ash-free dry substance roughly is more than 88%.

An advantage of the low carbon content of the present product as compared to carbon black consists in that the surface functionality originating from the renewable raw materials partly is maintained and can be utilized in the application for example via coupling reagents.

The STSA surface area of at least 5 m²/g and maximally 200 m²/g, preferably between 8 m²/g and 100 m²/g, furthermore distinguishes the present particulate carbon material from non-porous lignin or non-porous particulate material that has been produced by the hydrothermal carbonization, which usually has BET surface areas of less than 2 m²/g, wherein the—generally not measured—STSA surface areas naturally will be slightly below this value.

Furthermore, the present particulate carbon material thereby differs from particulate materials made of renewable raw materials, which have a high specific BET surface area due to their high porosity, such as for example pyrolysis coals, coals obtained via partial oxidation, coals obtained via hydrothermal carbonization, and activated carbons, due to the fact that the present particulate carbon material largely is not porous and very finely divided, which is seized by the STSA surface area.

In one variant of the present particulate carbon material, the STSA surface area has values between 10 m²/g and 80 m²/g, preferably between 12 m²/g and 70 m²/g, more preferably between 15 m²/g and 70 m²/g, in particular preferably between 20 m²/g and 70 m²/g.

Advantageously, the BET surface area of the present particulate carbon material only differs from the STSA surface area by maximally 20%, preferably by maximally 15%, more preferably by maximally 10%. Advantageously, the pore volume of the particulate carbon material is <0.1 cm³/g, more preferably <0.01 cm³/g, particularly preferably <0.005 cm³/g. Hence, the present particulate carbon material differs from finely divided porous materials such as for example ground biogenic powdered activated carbon, which beside a BET surface area of generally more than 500 m²/g can also have an STSA surface area of maximally 10 m²/g.

What is an advantage of the large STSA surface area as compared to lignin and HTC coals is the particular fineness of the product, which provides for a high degree of interactions between the present product and e.g. polymers. It is an advantage of the almost non-existent porosity of the present product that for example as compared to the utilization of porous carbon materials additives and cross-linking chemicals cannot lose their effectiveness by penetrating the pores.

Advantageously, the average size of the primary particles of the particulate carbon material however is limited to a value of greater than 8 nm, preferably greater than 10 nm, more preferably greater than 15 nm.

Advantageously, primary particles of the particulate carbon material have a heterogeneous size distribution. The smaller particle fraction accordingly has a size of greater than 8 nm, preferably greater than 10 nm, more preferably greater than 15 nm up to a size of 250 nm. The larger particle fraction has sizes above 250 nm.

Advantageously, the primary particles are intergrown to form aggregates, whereby the size of the primary particles differs from the size of the aggregates. Preferably, the size of the primary particles then is below 250 nm. In this preferred case, the primary particles are smaller than aggregates, preferably on average by at least a factor of 2, more preferably on average by at least a factor of 4. For clarification it should be added that in this preferred embodiment, too, primary particles can be present individually and can then theoretically be equated with aggregates. In this preferred embodiment, however, this only rarely is the case, preferably for less than 25%, more preferably for less than 20%, particularly preferably for less than 15%. This applies in particular for primary particles with a size of more than 250 nm.

As the size of the primary particles and aggregates is not or only insufficiently available by measuring the grain size, for example by laser diffraction or sieve analysis, images taken with a scanning electron microscope for example can be utilized to determine these sizes.

The oil absorption number (OAN) between 50 ml/100 g and 150 ml/100 g distinguishes the present particulate carbon material from carbon materials pulverized for example by grinding or steam explosion, which have smaller OAN values due to the missing aggregates or aggregates destroyed by the grinding process.

In another variant of the present particulate carbon material, the OAN value lies between 65 ml/100 g and 150 ml/100 g, more preferably between 70 ml/100 g and 130 ml/100 g, moreover preferably between 75 ml/100 g and 130 ml/100 g, in particular preferably between 80 ml/100 g and 120 ml/100 g. The OAN absorption is determined according to the standard ASTM D 2414-00.

An advantage of the high oil absorption number as compared to carbon products with a lower oil absorption number is the presence of aggregates that have an advantageous effect on the interactions between the present particular carbon material and for example polymers.

In one variant, the present particulate carbon material has a water content of less than 5 wt-%, preferably less than 3 wt-%, more preferably less than 2 wt-%. The present low water content or the dry condition of the carbon material provides for incorporating the same into polymers, e.g. as a filler, because a generation of steam bubbles at high temperature is avoided. In addition, increased moisture of the carbon material is disturbing for the use of coupling reagents.

In another embodiment, a 15% suspension of the particulate carbon material in distilled water has an electrical conductivity of less than 5 mS/cm, preferably less than 3 mS/cm, and particularly preferably less than 2 mS/cm. The electrical conductivity (determined as conductance of the measuring probe of the device PCE-PHD1 at 20° C. to 25° C.) in the present case serves as a measure for the ion content or the ion concentration, in particular of ions selected from the group including $Na^+$, $Ca^{2+}$, $SO_4^{2-}$, $CO_3^{2-}$, $S^{2-}$, $HS^-$. An advantage of the low conductivity is the small content of water-soluble ions, which might separate from the present product even when used for example in polymers.

Moreover, an embodiment of the particulate carbon material in a 15% suspension in distilled water has a pH value of >6, preferably >7, more preferably >8. Preferably, the pH value of a 15% suspension of the particulate carbon material in distilled water is less than 10, more preferably less than 9. An advantage of the neutral or slightly basic pH value of the present product for example is its good compatibility with the other components of the polymer mixture.

It also is advantageous when the present particulate carbon material has a D/G signal ratio in the Raman spectrum between 0.20 and 0.90, preferably between 0.40 and 0.75, more preferably between 0.45 and 0.70, as a measure for the content of graphitic carbon.

As a measure for the content of graphitic carbon in the material the area ratio D/G of the D-band to the G-band in the Raman spectrum can be used. The D-band (disorder band) lies above 1300 $cm^{-1}$ up to approximately 1360 $cm^{-1}$, and the G-band (graphite band) lies at approximately 1580-1590 $cm^{-1}$. To calculate the area ratio D/G, the integrals of the Raman spectrum over the D-band and the G-band are calculated and then brought into relation.

An advantage of the indicated D/G ratio consists in that the material in some applications—due to its content of graphitic carbon—can be utilized like a classical carbon black, and in addition—due to its content of amorphous carbon and the elements bound thereto—further functionalities are available.

In another embodiment, the present particulate carbon material has a low solubility in a basic solution.

Advantageously, the present particulate carbon material accordingly has a high resistance to bases. In the present case, a high resistance to bases means that less than 40%, preferably less than 30%, particularly preferably less than 15%, in particular less than 10% of the present particulate carbon material are dissolved. Preferably, the procedure to determine the resistance to bases is as follows:

weighing in solid, dry particulate carbon material that previously has been washed twice with five times the weight each of distilled water;

suspending in distilled water, so that the content of dry substance is about 5%;

increasing the pH value of the distilled water to a value of about 9 by adding sodium hydroxide solution;

increasing the temperature of the pH-adjusted suspension of the present carbon material and distilled water to about 80° C.;

stirring for a time of 2 hours under the above conditions;

after cooling the suspension to room temperature, repeating the process from the step of adjusting the pH value, until the pH value again corresponds to about 9 after cooling the suspension to room temperature;

centrifugation of the suspension for 15 minutes at 9000 revolutions per minute;

separation of the liquid phase and drying of the remaining solid residue; and weighing the dried residue.

The resistance to bases in percent is determined by dividing the dry weight of the weighed residue by the dry weight of the particulate carbon material weighed in and by multiplying this by 100. The solubility of the particulate carbon material in percent is determined by subtracting the resistance to bases from 100.

In so far, the particulate carbon material according to the invention differs from lignin in that its resistance to bases is distinctly increased. This has the advantage that e.g. in the case of the use as filler in rubber products or plastic products the present particulate carbon material is not easy to wash out from the rubber product or plastic product upon contact with water.

Advantageously, the particulate carbon material according to the invention has a surface chemistry comparable to silica. A surface chemistry comparable to silica means that the present carbon material has a high OH-group density. In particular, the oxygen content of the present ash-free particulate carbon material lies between 20 wt-% and 30 wt-%, preferably between 20 wt-% and 25 wt-%.

In so far, the present particulate carbon material differs from carbon black that is obtained from renewable raw materials for example by an intensive carbonization (pyrolysis, oxidation, hydrothermal carbonization, etc.) in that the functional groups of the renewable raw materials used for producing the present particulate carbon material were not largely separated by the thermal treatment, but still are available for binding to polymers or coupling reagents.

Preferably, the ash content of the particulate carbon material based on the dry substance is at least 1 wt-%, but less than 8 wt-%, more preferably at least 2 wt-% and less than 6 wt-%, moreover preferably at least 3 wt-% and less than 6 wt-%, in particular at least 4 wt-% and less than 6 wt-% (ash content according to DIN 51719 at 815° C.).

In a further-reaching variant of the present particulate carbon material the D90 of the Q3 distribution of the grain size (as a measure for the size of the particles present in separated form under the concrete conditions) is less than 30 µm, preferably less than 20 µm, more preferably less than 15 µm, more preferably less than 10 µm, in particular less than 5 µm. In a further-reaching variant of the present particulate carbon material the D99 of the Q3 distribution of the grain size is less than 30 µm, preferably less than 20 µm, more preferably less than 15 µm, more preferably less than 10 µm, in particular less than 5 µm. In a further-reaching variant of the present particulate carbon material the D99 of the Q3 distribution of the grain size is more than 1 µm, preferably more than 2 µm.

An advantage of the above maximum values of the Q3 distribution of the grain size consists in that due to the maximum size of the particles present in separated form the present particulate carbon material in use for example in polymers causes no impurity that would lead for example to a premature rupture or breakage of the polymer or to surface defects during extrusion.

The average sphere diameter determined with the aid of the STSA surface area on the assumption of a material density (raw density) of 1500 kg/m$^3$ advantageously is at least two times, preferably at least three times, more preferably at least four times, in particular at least six times as small as the average diameter (D50) measured over the Q3 distribution of the grain size of the particle present in separated form. The average sphere diameter is calculated with the aid of the following formulae:

$$\text{STSA surface area} = \text{sphere surface}/(\text{sphere volume} \times \text{material density}) \qquad 1.$$

$$\text{sphere surface} = PI \times \text{average sphere diameter}^2 \qquad 2.$$

$$\text{sphere volume} = \tfrac{1}{6} \times PI \times \text{average sphere diameter}^3 \qquad 3.$$

By inserting 2. and 3. into 1. the following relationship is obtained:

$$\text{average sphere diameter} = 6/(\text{STSA surface area} \times \text{material density})$$

The measurement of the grain size distribution of the particulate carbon material is made in a 10% suspension with distilled water by means of laser diffraction. Before and/or during the measurement of the grain size distribution, the sample to be measured is dispersed with ultrasound, until a grain size distribution stable over several measurements is obtained.

The STSA surface area of the present particulate carbon material preferably is largely independent of its Q3 distribution of the grain size and characterizes the fineness of the primary particles.

In a preferred embodiment, the present particulate carbon material has a $^{14}$C content corresponding to that of renewable raw materials, preferably greater than 0.20 Bq/g of carbon, in particular preferably greater than 0.23 Bq/g of carbon, preferably however each less than 0.45 Bq/g of carbon;

a carbon content based on the ash-free dry substance between 60 wt-% and 80 wt-%;

an STSA surface area of at least 5 m$^2$/g and maximally 200 m$^2$/g;

an oil absorption number (OAN) between 50 ml/100 g and 150 ml/100 g; and a D90 of the Q3 distribution of the grain size of less than 20 µm, preferably of less than 15 µm.

Advantageously, the present particulate carbon material has a shape that largely corresponds to the shape of classical carbon black. A shape of the present particulate carbon material comparable to classical carbon black for example is given by the fact that the particulate carbon material consists of few porous primary particles, several of which are intergrown to form aggregates, and the same in turn are at least partly agglomerated.

In so far, the present particulate carbon material usable e.g. as a filler differs from fillers according to the prior art, which for example are obtained by grinding renewable raw materials, in that the filler has a distinct structure that is comparable to the structure of classical carbon blacks. The shape can be determined for example by using SEM images.

The particulate carbon material usable as a filler preferably has a non-fibrous morphology, which means that the aspect ratio is less than 10, preferably less than 5.

In another preferred embodiment, the present particulate carbon material has a $^{14}$C content corresponding to that of renewable raw materials, preferably greater than 0.20 Bq/g of carbon, in particular preferably greater than 0.23 Bq/g of carbon, preferably however each less than 0.45 Bq/g of carbon;

a carbon content based on the ash-free dry substance of more than 60 wt-% and less than 80 wt-%;

an STSA of at least 5 m$^2$/g and maximally 200 m$^2$/g;

an OAN of 50 ml/100 g to 150 ml/100 g;

a surface chemistry comparable to silica; and a shape that largely corresponds to the shape of classical carbon black.

By the advantageous combination of the properties of a classical carbon black with respect to its shape with that of silica with respect to its surface chemistry, this preferred embodiment of the present particulate carbon material has a similar potential for interactions between filler and polymer as a classical carbon black and provides for additionally completing this interaction potential e.g. by coupling reagents via a similar mechanism such as silica.

The particulate carbon material can be used for example as filler or reinforcing filler. The particulate carbon material according to the invention can be used for example in rubber or rubber mixtures or plastics.

Another subject-matter of the invention is polymer mixtures that are characterized by the fact that they contain at least one polymer and at least one particulate carbon material according to the invention. Polymers can be thermoplastics, thermosets or elastomers.

A list of polymers is indicated for example in WO 2010/043562 A2 from page 10, line 20 to page 12, line 36, into which the particulate carbon material according to the invention can be incorporated. Preferred polymers are selected from a list with the following plastics or rubbers: polyester, polyethylene, polypropylene, polyester carbonates, polyamides, polyimides, polyester amides, polyether imides, polyurethanes, polyvinyl alcohols, polyvinyl acetates, polyvinyl chlorides, polymethacrylates, polystyrenes, styrene maleic anhydride, polycaprolactone, polybutylene terephthalate, polyepoxides; cellulose products such as cellulose acetate or cellulose nitrate, vulcanized fiber, polylactic acid, polyhydroxy alkanoates, chitin, casein, gelatin; formaldehyde resins, such as melamine-formaldehyde resin, urea-formaldehyde resin, melamine-phenol resins, phenol-formaldehyde resins; silicone polymer, natural rubber, styrene-butadiene copolymers, polybutadiene, polyisoprene, isobutylene-isoprene copolymers, ethylene-propylene-diene copolymers, acrylonitrile-butadiene copolymers, chloroprene, fluorine rubber or acrylic rubber and mixtures thereof.

Another subject-matter of the invention is rubber mixtures that are characterized by the fact that they contain at least one rubber and at least one particulate carbon material according to the invention.

The particulate carbon material can be used in quantities of 10 wt-% to 150 wt-%, preferably 20 wt-% to 120 wt-%, more preferably 40 wt-% to 100 wt-%, particularly preferably 50 wt-% to 80 wt-%, based on the weight of the used rubber.

The rubber mixture preferably contains at least the particulate carbon material according to the invention and in addition naturally occurring mineral, siliceous, calcareous or lime-containing fillers.

Preferably, the rubber mixture contains the particulate carbon material according to the invention and a coupling reagent, preferably an organosilane. The organosilanes can be for example bis(trialkoxysilylalkyl)oligosulfide or -polysulfide, for example bis(triethoxysilylpropyl)disulfide or bis (triethoxysilylpropyl)tetrasulfide, mercaptosilanes, aminosilanes, silanes with unsaturated hydrocarbon groups, for example vinyl silanes. Ultimately, silanes with large saturated hydrocarbon groups, for example dodecyltriethoxysilane, also can act like coupling reagents, wherein however no covalent bonds, but rather van-der-Waals forces effect a certain coupling to the polymer.

The organosilane preferably is used in quantities of 2 wt-% to 16 wt-%, more preferably 4 wt-% to 14 wt-%, particularly preferably 6 wt-% to 12 wt-%, based on the weight of the used particulate carbon material.

When using an organosilane together with an expression of the particulate carbon material according to the invention with an STSA surface area comparable to that of a non-active carbon black, selected rubber-technological characteristic values preferably are achieved in the cross-linked condition of the rubber mixture, which are comparable to those achieved when using a semi-active carbon black or a silica together with an organosilane.

When using an organosilane together with the particulate carbon material according to the invention, selected rubber-technological characteristic values preferably not only are achieved, but also surpassed in the cross-linked condition of the rubber mixture, which are achieved when using a carbon black with an STSA surface area comparable to that of the particulate carbon material.

In another preferred variant the rubber mixture contains the particulate carbon material according to the invention and a reagent masking the functional groups, preferably an organosilane, an amine or a glycol. In this connection, for example triethanolamine, hexamethylenetetramine, di-o-tolylguanidine or diphenylguanidine can be used as amine. Suitable glycols include ethylene glycol, tetraethylene glycol or polyethylene glycol. The organosilane can be a trialkoxysilylalkylsilane, for example triethoxymethylsilane, triethoxyethylsilane or triethoxypropylsilane. The above reagents are not able to be incorporated into the cross-linkage via sulfur bridges. However, they react with the surface of the carbon material according to the invention by consuming the functional groups, so that the same have a less adverse effect on the sulfur cross-linkage. Thus, the triethoxyalkylsilanes do not act like a coupling reagent. Apart from the avoidance of a disturbed sulfur cross-linkage such silanes however act as compatibilizers that adapt the surface energy of the filler particles to that of the polymer matrix and in this way lead to a distinctly improved dispersibility.

Preferably, a carbon black in a rubber mixture can be substituted by the present particulate carbon material for up to 100%, and in the cross-linked condition a performance comparable to carbon black in terms of selected rubber-technological characteristic values nevertheless can be achieved.

Preferably, silica in a rubber mixture furthermore can be substituted by the present particulate carbon material for up to 100%, and in the cross-linked condition a performance comparable to silica in terms of selected rubber-technological characteristic values nevertheless can be achieved, wherein preferably an organosilane is used.

Preferred rubber-technological characteristic values include the modulus 50% and the modulus 200% determined in the tensile test. What is preferred are high values for the modulus 50% and the modulus 200%.

A further preferred rubber-technological characteristic value is the loss factor tan delta (quotient of loss modulus E" and storage modulus E' of the elastomer material) at temperatures between 40° C., preferably 50° C., more preferably 60° C. and 100° C., determined in a dynamic mechanical analysis (temperature sweep). This characteristic value is a widely used predictor value for the rolling friction in the tire industry. What is preferred are low values for tan delta in the indicated temperature range, more preferably the tan delta decrease is at least 10% with respect to the carbon black reference, quite particularly preferably the tan delta decrease is at least 15% with respect to the carbon black reference. An additional preferred rubber-technological characteristic value is the loss factor tan delta at 0° C., determined in a dynamic mechanical analysis (temperature sweep). This characteristic value is a widely used predictor value for the wet grip in the tire industry, wherein for tan delta at 0° C. high values are preferred, more preferably the tan delta increase is at least 10% with respect to the carbon black reference.

In a preferred embodiment, the rubber mixture also contains carbon blacks, preferably semi-active carbon blacks or active carbon blacks, beside the particulate carbon material.

This rubber mixture preferably contains at least the particulate carbon material, at least one carbon black, preferably a semi-active carbon black or an active carbon black and naturally occurring mineral, siliceous, calcareous or lime-containing fillers.

This rubber mixture preferably contains at least the particulate carbon material, at least one carbon black, preferably a semi-active carbon black or an active carbon black and naturally occurring mineral, siliceous, calcareous or lime-containing fillers and at least one organosilane.

The advantage of the simultaneous use of the particulate carbon material together with a carbon black consists in that particular rubber-technological characteristic values of the vulcanized rubber mixture can be improved.

In another embodiment, the rubber mixture also contains silicas, preferably precipitated and pyrogenic silicas beside the particulate carbon material according to the invention, and further can contain naturally occurring mineral, siliceous, calcareous or lime-containing fillers and an organosilane.

For producing the rubber mixtures according to the invention, synthetic rubbers also are suitable beside natural rubber (NR). Preferred synthetic rubbers are described for example in W. Hofmann, Kautschuktechnologie, Genter Verlag, Stuttgart 1980 or in WO 2010/043562 from page 15, line 4 to page 15, line 24. Further preferred synthetic rubbers are indicated for example in the following list: Styrene-butadiene copolymers (SBR), polybutadiene (BR), polyisoprene, isobutylene-isoprene copolymers, ethylene-propylene-diene copolymers, acrylonitrile-butadiene copolymers (NBR), chloroprene, fluorine rubber or acrylic rubber and mixtures thereof.

The rubber mixtures according to the invention can contain further rubber adjuvants, such as reaction promoters, aging inhibitors, heat stabilizers, light stabilizers, antiozonants, processing aids, plasticizers, tackifiers, blowing agents, dyes, pigments, waxes, diluents, organic acids, retarders, metal oxides as well as activators such as diphenylguanidine, triethanolamine, polyethylene glycol, alkoxyterminated polyethylene glycol or hexane triol, which are known in the rubber industry.

Useful cross-linkers include sulfur, organic sulfur donors or radical formers. The rubber mixtures according to the invention in addition can contain vulcanization accelerators.

Mixing the rubbers with the particulate carbon material, possibly carbon blacks, possibly silicas, possibly rubber adjuvants and possibly organosilanes, can be carried out in usual mixing units such as rolling mills, internal mixers and mixing extruders. Usually, such rubber mixtures are produced in an internal mixer, wherein initially the rubbers, the particulate carbon material, possibly carbon blacks, possibly silica, possibly rubber adjuvants and possibly organosilanes are admixed in one or more successive thermomechanical mixing stages at a temperature of 100° C. to 170° C. The sequence of addition and the time of addition of the individual components can have a decisive effect on the properties of the mixture obtained. The rubber mixture thus obtained then is usually mixed with the cross-linking chemicals in an internal mixer or on a rolling mill at 40-120° C. and processed to obtain the so-called green compound for the succeeding process steps, such as for example shaping and vulcanization.

The vulcanization of the rubber mixtures according to the invention can be effected at temperatures of 80° C. to 200° C., preferably 130° C. to 180° C., possibly under a pressure of 10 to 200 bar.

The rubber mixtures according to the invention are suitable for manufacturing rubber articles, i.e. articles made of the completely cross-linked or vulcanized elastomers, so-called molded articles, for example for manufacturing pneumatic tires, tire treads, tire side walls, cable sheaths, hoses, drive belts, conveyor belts, roll coverings, tires, shoe soles, buffers, sealing rings, profiles and damping elements.

Another subject-matter of the invention is plastic mixtures that are characterized by the fact that they contain at least one plastic and at least one particulate carbon according to the invention. Plastic in this connection means a thermoplastic or thermoset.

The particulate carbon material can be used in quantities of 10 wt-% to 150 wt-%, preferably 20 wt-% to 120 wt-%, more preferably 30 wt-% to 100 wt-%, based on the weight of the used plastic.

Preferably, the plastic mixture contains the particulate carbon material according to the invention and an adhesion promoter or a coupling reagent.

Preferably, promoting the adhesion is based on the use of maleic anhydride or other organic acids, preferably unsaturated carboxylic acids. Useful adhesion promoters also include for example silanes, preferably with particularly large hydrocarbon residues, for example dodecyltriethoxysilane.

The adhesion promoter preferably is used in quantities of 2 wt-% to 16 wt-%, more preferably 4 wt-% to 14 wt-%, particularly preferably 6 wt-% to 12 wt-%, based on the weight of the plastic used.

Plastics include for example polyethylene (PE), polypropylene (PP), polyvinyl acetate (PVA) or thermoplastic elastomers (TEP). The plastic mixtures according to the invention preferably are used for manufacturing cables, tubes, fibers, films, in particular agricultural films, engineering plastics and injection molded articles.

The present particulate carbon material is produced by a method according to the invention, which in particular provides for adjusting the STSA surface area and the OAN value to the range indicated above.

According to the invention, there is provided a multi-stage, in particular four-stage method for the hydrothermal treatment, in particular carbonization of renewable raw materials, in particular of renewable raw materials with a content of more than 80% Klason lignin, in which in a first step a liquid containing the renewable raw material is provided, which in a second step is subjected to a hydrothermal treatment at a temperature between 150° C. and 250° C., in a third step the solid present after the hydrothermal treatment is largely separated from the liquid, and the residual moisture of the solid in a fourth step largely is removed by drying, whereby a particulate carbon material is obtained, wherein the STSA surface and the OAN value of the particulate carbon material obtained in the fourth step are controlled by mutually matching the concentration of the organic dry matter of the renewable raw material in the liquid containing the renewable raw material, the pH value of the liquid containing the renewable raw material, the concentration of inorganic ions in the liquid containing the renewable raw material, the temperature of the hydrothermal treatment, and the residence time in the hydrothermal treatment, and thus an STSA surface area of at least 5 $m^2$/g and maximally 200 $m^2$/g and an OAN value of at least 50 ml/100 g and maximally 150 ml/100 g is adjusted.

Preferably, instead of the concentration of the inorganic ions of the liquid containing the renewable raw material the conductance of the liquid containing the renewable raw material is employed.

By mutually matching the pH value, the conductivity and the amount of inorganic dry matter as well as the temperature and the residence time in the hydrothermal treatment, conditions are applicable during the hydrothermal treatment that lead to obtaining the present particulate carbon material. In particular, the pH value and the conductivity are changed during the hydrothermal treatment and only in the course of the process form conditions that produce the present particulate carbon material.

Preferably, the STSA surface area and the OAN value of the particulate carbon material obtained in the fourth step are controlled by mutually matching the concentration of the organic dry matter of the renewable raw material in the liquid containing the renewable raw material, the pH value of the liquid containing the renewable raw material, the concentration of inorganic ions in the liquid containing the renewable raw material, the temperature of the hydrothermal treatment, and the residence time in the hydrothermal treatment, and the desired STSA surface area is adjusted in that with a desired increase of the STSA surface area the concentration of the organic dry matter of the renewable raw material in the liquid containing the renewable raw material is decreased and/or the pH value of the liquid containing the renewable raw material is increased and/or the concentration of inorganic ions in the liquid containing the renewable raw material is decreased.

Furthermore preferably, the desired STSA surface area is adjusted in that with a desired increase of the STSA surface area the temperature of the hydrothermal treatment is increased and/or the residence time in the hydrothermal treatment is prolonged.

Preferably, with a desired increase of the STSA surface area the temperature of the hydrothermal treatment is increased and/or the residence time in the hydrothermal treatment is prolonged when the yield of dry particulate carbon material is very low, preferably less than 10%, furthermore preferably less than 20%, moreover preferably less than 30%, particularly preferably less than 40%, each based on the dry weight of the renewable raw material.

Preferably, the STSA surface area and the OAN value of the particulate carbon material obtained in the fourth step are controlled by mutually matching the concentration of the organic dry matter of the renewable raw material in the liquid containing the renewable raw material, the pH value of the liquid containing the renewable raw material, the concentration of inorganic ions in the liquid containing the renewable raw material, the temperature of the hydrothermal treatment, and the residence time in the hydrothermal treatment, and the desired STSA surface area is adjusted in that with a desired reduction of the STSA surface area the concentration of the organic dry matter of the renewable raw material in the liquid containing the renewable raw material is increased and/or the pH value of the liquid containing the renewable raw material is decreased and/or the concentration of inorganic ions in the liquid containing the renewable raw material is increased.

More preferably, the desired STSA surface area preferably is adjusted in that with a desired reduction of the STSA surface area the temperature of the hydrothermal treatment is lowered and/or the residence time in the hydrothermal treatment is shortened.

What is meant by temperature and residence time not only is the maximum temperature that is maintained over a certain residence time, but the temperature-time profile that is passed through in the second step. When no temperature-time profile is indicated below, temperature however means the maximum temperature that is maintained over a certain residence time. In the following, temperature and residence time jointly are referred to as process conditions.

The present method offers the advantage over the prior art that the formation of the desired finely divided particles is not terminated already in the first step, but conditions that lead to the formation of the particulate carbon material with a corresponding STSA surface area and OAN value only are accomplished during the hydrothermal treatment in the second step. Only such a procedure provides for at the same time accomplishing a particle formation and a reaction which in the end leads to a particulate carbon material that differs from the used renewable raw material also with regard to its carbon content or its resistance to bases.

The present method in particular has the advantage that by the preferred adjustment and mutual matching of the concentration of the organic dry matter of the renewable raw material in the liquid containing the renewable raw material, of the pH value of the liquid containing the renewable raw material, of the concentration of inorganic ions in the liquid containing the renewable raw material, of the temperature of the hydrothermal treatment, and of the residence time in the hydrothermal treatment, the polymerization of the renewable raw material in the second step largely is suppressed or limited to such an extent that a particulate carbon material with a corresponding STSA surface area and OAN value is obtained, and via the grain size distribution, i.e. the size distribution of the agglomerates or the particles present in separated form under certain conditions, the size of the primary particles can be influenced directly, which is seized by the STSA surface area. In addition, the build-up of porosity in the material is suppressed, which is revealed by a small difference between STSA surface area and BET surface area of the particulate carbon material.

Preferably, for the Adjustment and Mutual Matching of the concentration of the organic dry matter of the renewable raw material in the liquid containing the renewable raw material, of the pH value of the liquid containing the renewable raw material, of the concentration of inorganic ions in the liquid containing the renewable raw material, of the temperature of the hydrothermal treatment, and of the residence time in the hydrothermal treatment, one or more of the following measured quantities is employed:

specific density of the liquid containing the renewable raw material after the second step;

conductivity of the liquid containing the renewable raw material after the second step;

pH value of the liquid containing the renewable raw material after the second step;

difference of the pH value of the liquid containing the renewable raw material before and after the second step;

difference of the conductances of the liquid containing the renewable raw material before and after the second step;

Advantageously, the STSA surface area and the OAN value of the particulate carbon material obtained in the fourth step are controlled by adjusting the concentration of the organic dry matter of the renewable raw material in the liquid containing the renewable raw material preferably to a value between 5 wt-% and 40 wt-%, more preferably between 10 wt-% and 20 wt-%, the pH value of the liquid containing the renewable raw material at 20° C. to 25° C. preferably to a value$\geq 7$, more preferably $\geq 8$, in particular preferably $\geq 8.5$, more preferably $\geq 11$, the concentration of inorganic ions in the liquid containing the renewable raw material preferably to a value between 10 mS/cm and 200 mS/cm, preferably between 10 mS/cm and 150 mS/cm, more preferably between 10 mS/cm and 50 mS/cm, moreover preferably between 10 mS/cm and 40 mS/cm, in particular preferably between 10 mS/cm and 25 mS/cm (determined as conductance of the measuring probe of the PCE-PHD1 at 20° C. to 25° C.), the temperature of the hydrothermal treatment preferably to a maximum value between 200° C. and 250° C., preferably to a maximum value between 210° C. and 245° C. and/or the residence time in the hydrothermal treatment preferably to a period between 1 minute and 6 hours, preferably between 30 minutes and 4 hours, in particular preferably between 1 hour and 3 hours, and thus an STSA surface area between 5 $m^2$/g and 200 $m^2$/g and an OAN value between 50 ml/100 g and 150 ml/100 g is adjusted.

Advantageously, the renewable raw material in the first step is completely dissolved in the liquid containing the renewable raw material. Alternatively, the renewable raw material in the first step is not completely dissolved in the liquid containing the renewable raw material, wherein however the concentration of the organic dry matter of the renewable raw material in the liquid containing the renewable raw material, the pH value of the liquid containing the renewable raw material, the concentration of inorganic ions in the liquid containing the renewable raw material are adjusted such that due to the temperature increase during the hydrothermal treatment in the second step the renewable raw material initially is dissolved completely, before the solid separable in the third step is formed in the second step.

An advantage of the complete dissolution of the renewable raw material in the liquid containing the renewable raw material consists in that a solid-solid transition is suppressed and the solid separable in the third step is formed completely from the solution, i.e. a transition from the solution to the solid occurs.

Advantageously, the method is operated continuously, wherein the process conditions of the hydrothermal treatment are kept constant in the second step and a continuous adjustment of the pH value and the conductance of the liquid containing the renewable raw material is effected in the first step in order to compensate fluctuations in the quality of the renewable raw material.

This procedure has the advantage that the substantially more expensive adjustment of the process conditions in the second step can be avoided.

In a particular variant of the method, the temperature and the residence time are adjusted in the second step such that to achieve an STSA surface area between 5 $m^2$/g and 200 $m^2$/g and an OAN value between 50 ml/100 g and 150 ml/100 g a slightly higher concentration of inorganic ions is required than is initially obtained after the adjustment of the organic dry matter content of the renewable raw material in the liquid containing the same and the adjustment of the pH value, and subsequently, a further increase of the concentration of inorganic ions by addition of salts can be made, until the concentration of inorganic ions, as measured by the conductance, appropriate for the process conditions of the second stage has been achieved.

This procedure has the advantage that the conductance can be used for the fine adjustment of the quality of the liquid containing the renewable raw material, as the same can be measured much more easily and reliably than the pH value.

Advantageously, the adjustment of the concentration of the organic dry matter of the renewable raw material in the liquid containing the renewable raw material, of the pH value of the liquid containing the renewable raw material, and/or of the concentration of inorganic ions in the liquid containing the renewable raw material is effected in the first step.

Alternatively, the adjustment of the concentration of the organic dry matter of the renewable raw material in the liquid containing the renewable raw material, of the pH value of the liquid containing the renewable raw material, and/or of the concentration of inorganic ions in the liquid containing the renewable raw material advantageously is effected in the first step and in the second step.

Alternatively, the adjustment of the concentration of the organic dry matter of the renewable raw material in the liquid containing the renewable raw material, of the pH value of the liquid containing the renewable raw material, and/or of the concentration of inorganic ions in the liquid containing the renewable raw material advantageously is effected in the second step.

In the embodiments in which the adjustment of the concentration of the organic dry matter of the renewable raw material in the liquid containing the renewable raw material, of the pH value of the liquid containing the renewable raw material and/or of the concentration of inorganic ions in the liquid containing the renewable raw material also is effected in the second step, the renewable raw material in the liquid containing the renewable raw material advantageously is completely dissolved in the first step and the formation of the desired finely divided particles during the hydrothermal treatment in the second step is accomplished not only by the chosen process conditions, but in addition by increasing the concentration of the organic dry matter of the renewable raw material in the liquid containing the renewable raw material, by lowering the pH value of the liquid containing the renewable raw material or by increasing the concentration of inorganic ions in the liquid containing the renewable raw material.

It is an advantage of such procedure that the conditions that lead to the formation of the desired finely divided particles specifically can be accomplished in the second step and the stability of the method thereby can be increased and the residence time in the second step possibly can be reduced.

Moreover, after completion of the formation of the desired finely divided particles in the second step, a decrease of the concentration of the organic dry matter in the liquid containing the particulate carbon material, an increase of the pH value of the liquid containing the particulate carbon material or a decrease of the concentration of inorganic ions in the liquid containing the particulate carbon material advantageously is accomplished. Advantageously, this already is effected in the second step or in the third step at the latest.

By this procedure it is ensured that after completion of the formation of the desired finely divided material no further solids are formed for example during the cooling phase at the end of the second step or due to an increase of the concentration of the organic dry matter in the liquid containing the particulate carbon material for example by evaporation in the third step.

During the hydrothermal treatment the pressure at least corresponds to the saturated vapor pressure of the liquid containing the renewable raw material.

In a Preferred Embodiment the concentration of organic dry matter of a liquid containing lignin in the first step lies between 10 wt-% and 20 wt-%, the pH value of the liquid containing lignin in the first step is more than 8.5 and less than 10.5, the concentration of the inorganic ions of the liquid containing lignin in the first step is such that the conductivity lies between 10 mS/cm and 25 mS/cm, the maximum temperature of the hydrothermal treatment in the second step lies between 210° C. and 240° C., and the residence time of the liquid containing lignin in the hydrothermal treatment in the second step lies between 120 and 240 minutes, whereby the STSA surface area of the particulate carbon material thus produced, which is measured after dewatering in the third step and drying in the fourth step, has a value between 5 $m^2/g$ and 50 $m^2/g$ and an OAN value between 50 ml/100 g and 100 ml/100 g.

The method according to the invention furthermore can include a washing step subsequent to dewatering in the third step or a pulverizing step subsequent to drying in the fourth step.

Drying in the fourth step preferably is carried out at temperatures below the softening point of the particulate carbon material, preferably at temperatures below 150° C., more preferably at temperatures below 130° C.

Advantageously, the D90 of the Q3 distribution of the grain size of the particulate carbon material after drying in the fourth step is adjusted by a pulverizing step to a value of less than 30 μm, preferably less than 20 μm, more preferably less than 15 μm, and particularly preferably less than 10 μm.

The method in particular can do without the addition of a co-polymerizable compound or a polymerization initiator and without a fermentation of the biomass.

The method operates in the liquid phase, wherein the method always takes place below the critical point of water.

The present invention will subsequently be explained in detail with reference to exemplary embodiments. In the drawing.

Figure 3:
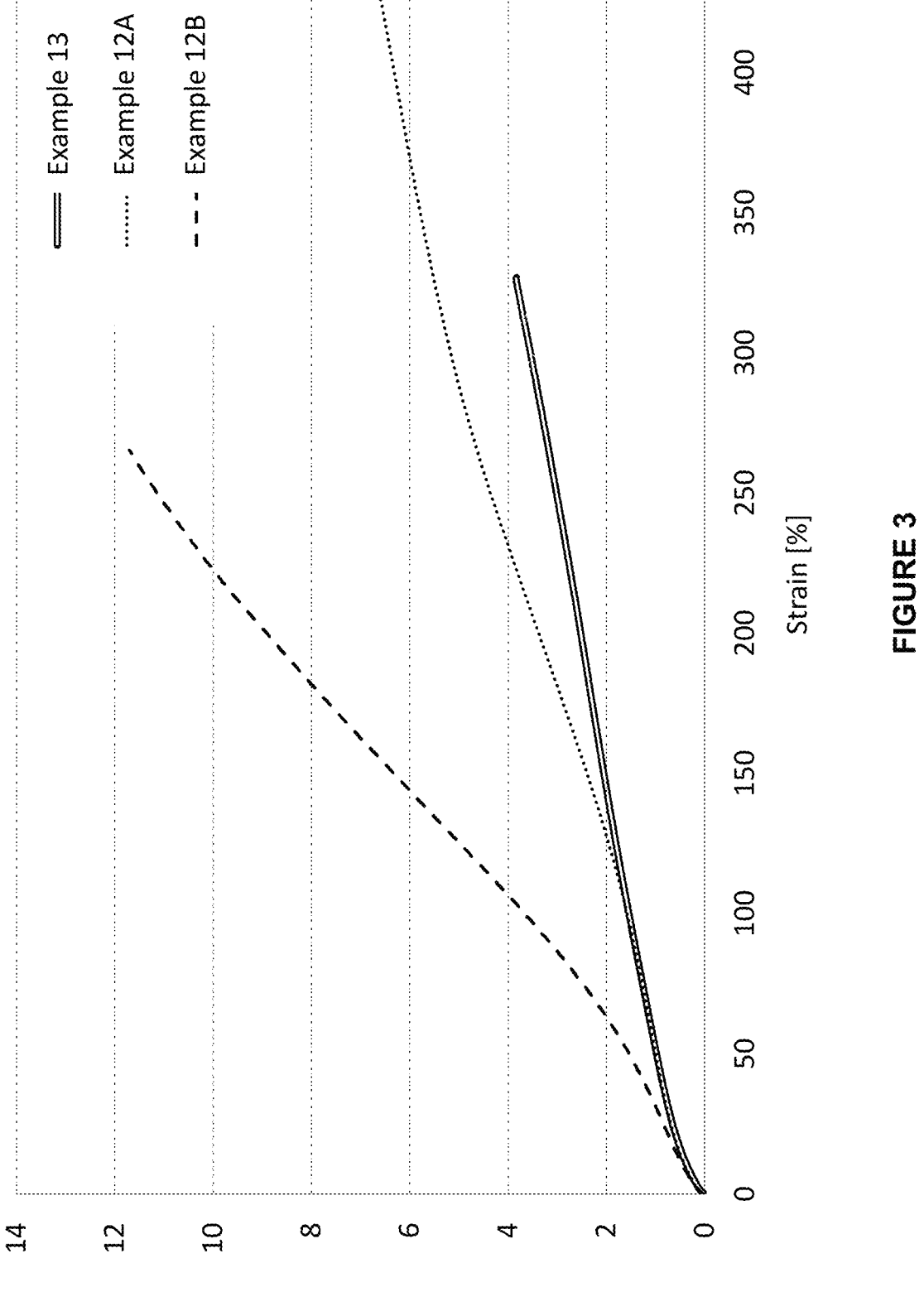

FIG. 3 shows a diagram of the stress-strain distribution in the tensile test as a comparison of the rubber-technological characteristic values of cross-linked rubber articles made of SBR, which are provided with untreated lignin, with the particulate carbon material according to the invention, but without a coupling reagent, and with the particulate carbon material according to the invention and a coupling reagent.

Figure 4:
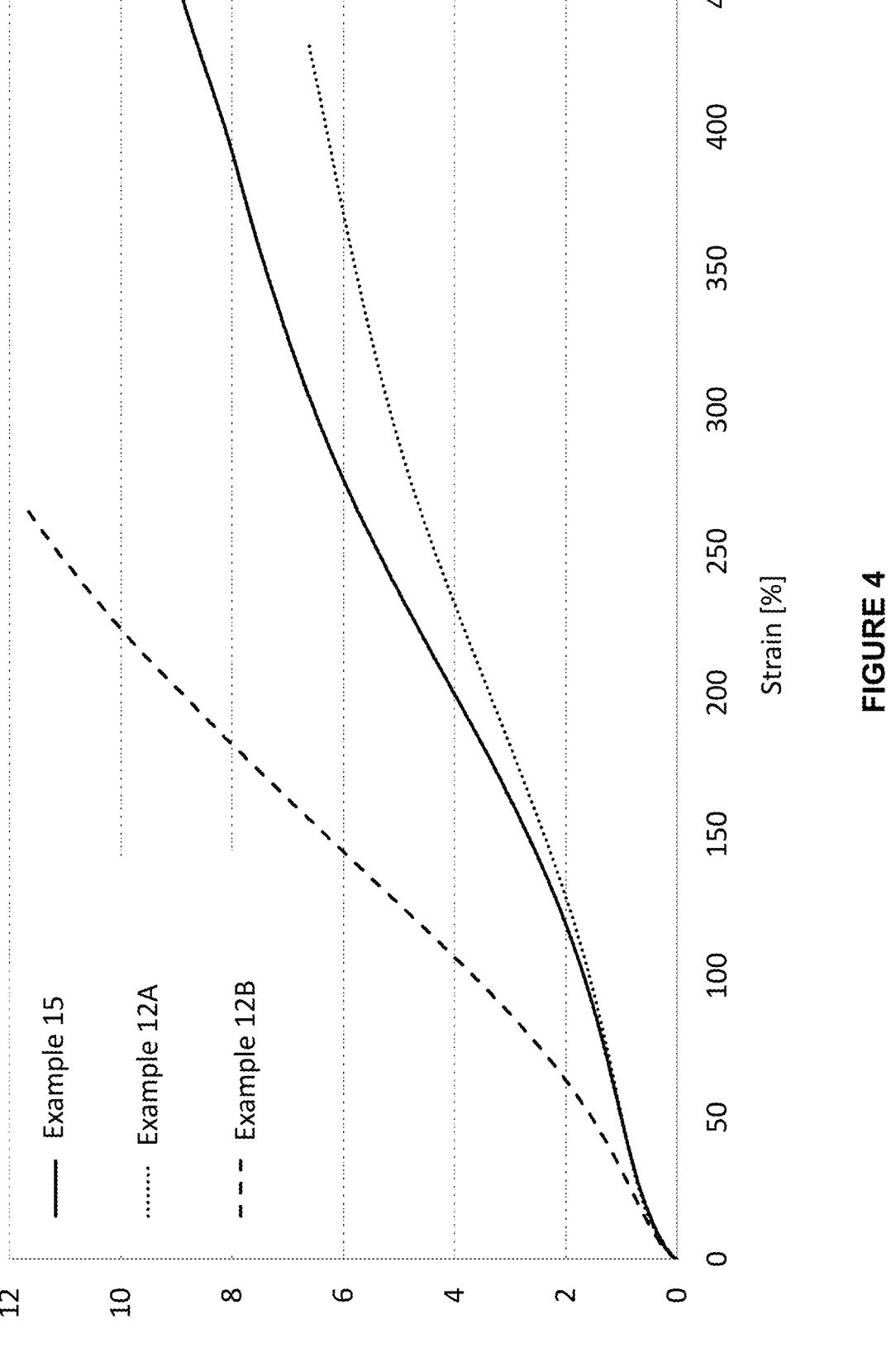

FIG. 4 shows a diagram of the stress-strain distribution in the tensile test as a comparison of the rubber-technological characteristic values of cross-linked rubber articles made of SBR, which are provided with particulate carbon material according to the invention, but without any further additive, with the particulate carbon material according to the invention and a reagent for masking the functional groups, and with the particulate carbon material according to the invention and a coupling reagent.

Figure 5:
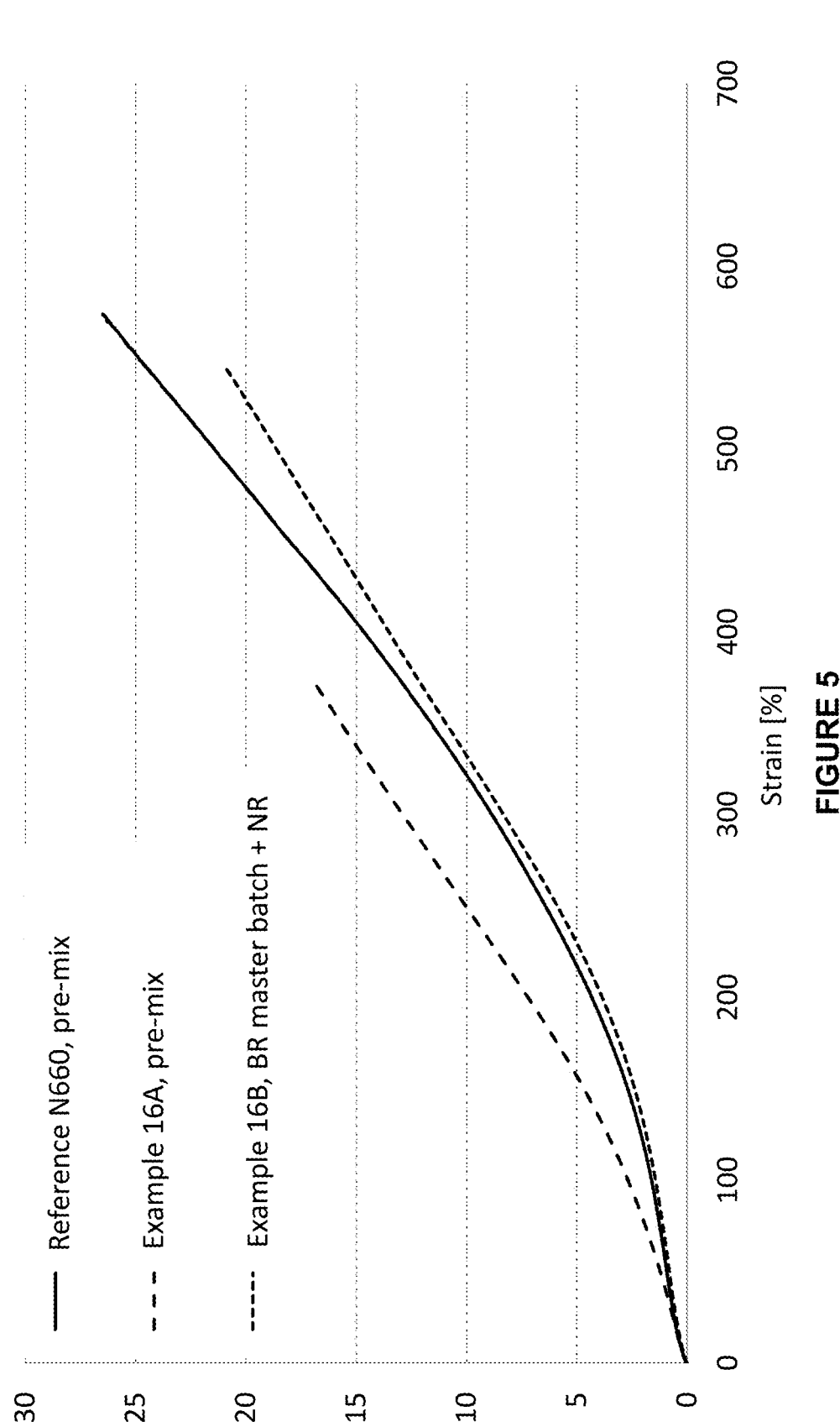

FIG. 5 shows a diagram of the stress-strain distribution in the tensile test as a comparison of the rubber-technological characteristic values made of elastomer material mixtures based on natural rubber and butadiene rubber NR/BR and the particulate carbon material, each with different mixing procedures, and of the reference.

Figure 6:
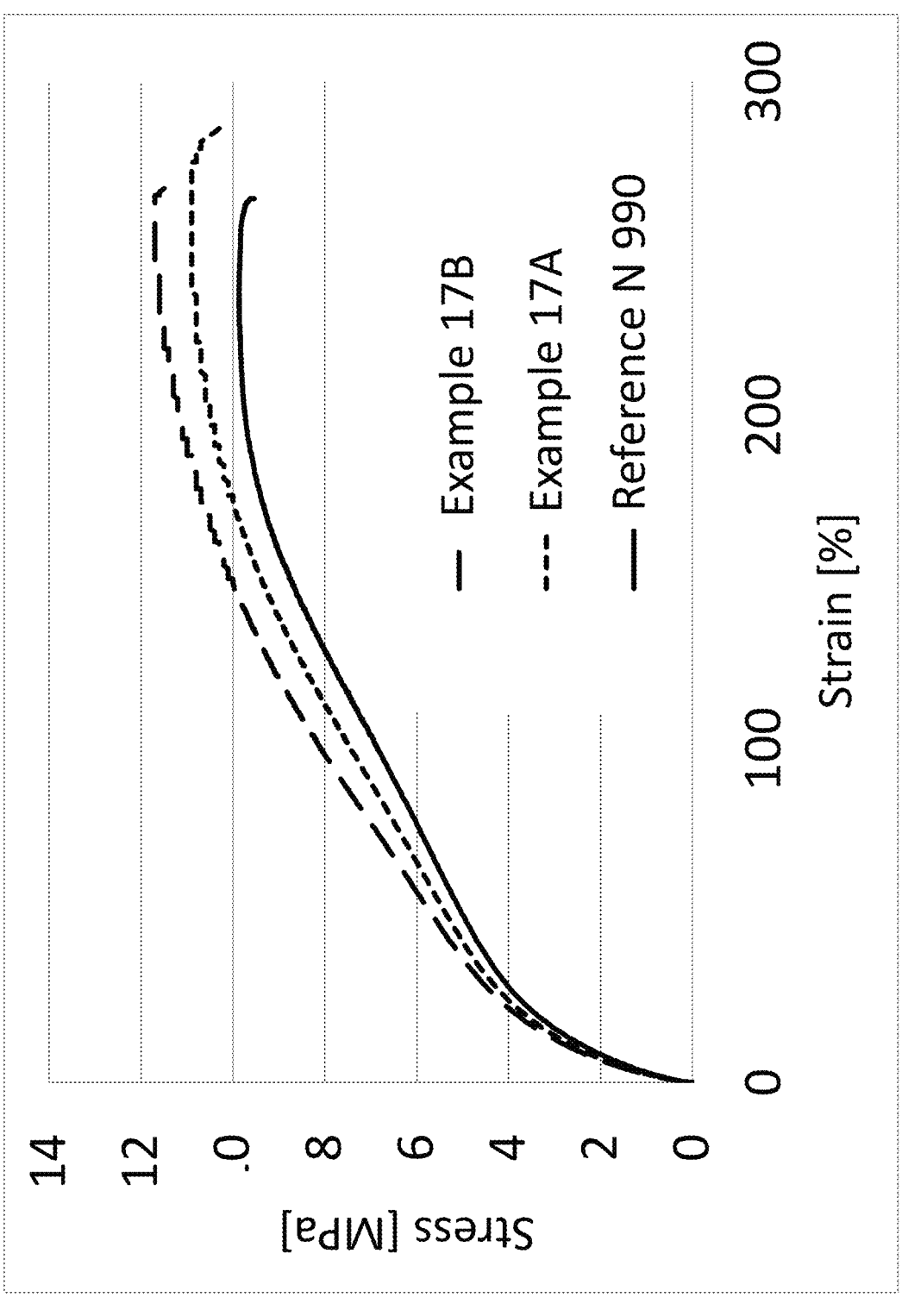

FIG. 6 shows a diagram of the stress-strain distribution in the tensile test as a comparison of the rubber-technological characteristic values of cross-linked rubber articles made of SBR, which are provided with the particulate carbon material according to the invention without a coupling reagent, and of the reference.

The exemplary embodiments describe the method according to the invention for obtaining the particulate carbon material according to the invention, its properties and its performance in the cross-linked rubber.

Examples 1-11 for Producing the Particulate Carbon Material from Lignin

In a first step a liquid containing the renewable raw material is provided.

Initially, water (1) and lignin (2) are mixed and a lignin-containing liquid with an adjusted content of organic dry matter (3) is prepared.

The lignin subsequently is completely dissolved in the lignin-containing liquid. For this purpose, the pH value is adjusted to the desired value (7) by adding a base or an acid (6).

The preparation of the solution is supported by intensive mixing at a suitable temperature (4) for a sufficient period (5). By the added base or acid and by salts that are added in addition (8) and/or also originate from the ash content of the lignin a particular concentration of inorganic ions is adjusted, which can be measured as conductivity (9). The composition and properties of the lignin-containing liquid thus prepared are indicated in Table 1

TABLE 1

| | | | | | | | | | | | | | |
|---|---|---|---|---|---|---|---|---|---|---|---|---|---|
| | | | | | | | Example | | | | | | |
| | 1 | | 2 | 3 | 4 | 5 | 6 | | 7 | 8 | | 9 | |
| — | ml | Type | Type | g | % | ° C. | h | Additive | g | — | Additive | g | mS/cm |
| 1 | 10200 | distilled water | Lignin 1 | 1800 | 14.1 | 80 | 2 | NaOH | 107.25 | 10.1 | — | 0.0 | 15.1 |
| 2 | 10200 | distilled water | Lignin 1 | 1800 | 14.1 | 80 | 2 | NaOH | 128.40 | 10.3 | — | 0.0 | 17.5 |
| 3 | 10200 | distilled water | Lignin 2 | 1800 | 14.2 | 80 | 2 | NaOH | 111.60 | 10.2 | — | 0.0 | 18.1 |
| 4 | 10200 | distilled water | Lignin 2 | 1800 | 14.2 | 80 | 2 | NaOH | 111.60 | 10.2 | — | 0.0 | 20.1 |
| 6 | 3854 | tap water Ludwigsfelde | Lignin 3 | 1092 | 14.8 | 80 | 2 | NaOH | 54.00 | 9.6 | — | 0.0 | 15.9 |
| 7 | 3854 | tap water Ludwigsfelde | Lignin 3 | 1092 | 14.8 | 80 | 2 | NaOH | 54.00 | 9.6 | — | 0.0 | 15.9 |
| 8 | 3854 | tap water Ludwigsfelde | Lignin 3 | 1092 | 14.8 | 80 | 2 | NaOH | 54.00 | 9.6 | — | 0.0 | 15.9 |
| 9 | 3854 | tap water Ludwigsfelde | Lignin 3 | 1092 | 14.8 | 80 | 2 | NaOH | 54.00 | 9.6 | — | 0.0 | 15.9 |
| 10 | 3854 | tap water Ludwigsfelde | Lignin 3 | 1092 | 14.8 | 80 | 2 | NaOH | 54.00 | 9.6 | — | 0.0 | 15.9 |
| 11 | 48.23 | distilled water | Lignin 1 | 20.9 | 14.1 | 80 | 2 | NaOH | 0.44 | 9.8 | — | 0.0 | 17.7 |

The composition of the lignin used is indicated in Table 2.

TABLE 2

| | Lignin 1 | Lignin 2 | Lignin 3 |
|---|---|---|---|
| C | 62.8 | 64.0 | 67.2 |
| H | 4.8 | 5.2 | 5.5 |
| O (calculated) | 24.8 | 24.0 | 24.0 |
| N | 0.3 | 0.0 | 0.0 |
| S | 1.3 | 1.5 | 1.8 |
| Na | 2.5 | 1.9 | 0.3 |
| Ash (without Na) | 3.6 | 4.1 | 1.2 |

In the second step, the liquid containing the renewable raw material is subjected to a hydrothermal treatment and thus a solid is obtained.

The solution prepared in the first step is heated from a starting temperature (10) for a heating time (11) to a reaction temperature (12) that is maintained for a reaction period (13). Subsequently, cooling for a cooling time (14) to an end temperature (15) is effected. As a result, a solid is obtained. In dependence on the aforementioned process conditions the pH value (16) and the conductivity (17) of the liquid containing the solid are changed.

With an appropriate adjustment of the content of organic dry matter, the pH value and the concentration of inorganic ions in the first step, and an appropriate choice of the process conditions in the second step, conditions are obtained in the second step at which the particulate carbon material separates from the solution in a raw form. The process conditions of the second step are indicated in Table 3.

TABLE 3

| | | | | Example | | | | |
|---|---|---|---|---|---|---|---|---|
| | 10 | 11 | 12 | 13 | 14 | 15 | 16 | 17 |
| — | ° C. | min | ° C. | min | min | ° C. | — | mS/cm |
| 1 | 80 | 90 | 240 | 150 | 3600 | 80 | 9.0 | 19.7 |
| 2 | 80 | 90 | 240 | 150 | 3600 | 80 | 9.1 | 21.4 |
| 3 | 80 | 90 | 240 | 150 | 3600 | 80 | 8.6 | 20.2 |
| 4 | 80 | 90 | 240 | 150 | 3600 | 80 | 8.4 | 21.1 |
| 6 | 30 | 40 | 225 | 324 | 40 | 30 | 8.4 | 13.2 |
| 7 | 30 | 40 | 225 | 408 | 40 | 30 | 8.3 | 13.5 |
| 8 | 30 | 41 | 230 | 270 | 41 | 30 | 8.3 | 13.5 |
| 9 | 30 | 41 | 230 | 300 | 41 | 30 | 8.2 | 13.7 |
| 10 | 30 | 42 | 235 | 162 | 42 | 30 | 8.7 | 12.9 |
| 11 | 30 | 41 | 230 | 180 | 41 | 30 | 8.6 | 20.9 |

In the third step, the raw particulate carbon material is dewatered and possibly washed. The raw particulate carbon material is largely separated from the liquid containing the same by a dewatering step (18). Subsequently, the raw particulate carbon material is washed with a multiple amount of water and dewatered again. The process conditions of the third step are summarized in Table 4.

TABLE 4

| | | | | Example |
|---|---|---|---|---|
| | | | | 19 |
| | 18 | | | Amount of washing liquid kg/kg of dry particulate |
| — | Device | Type | Washing liquid | carbon material |
| 1 | centrifuge; 6000 RPM/15 min | resuspension/centrifuge; 6000 RPM/15 min | distilled water | 3 |
| 2 | centrifuge; 6000 RPM/15 min | resuspension/centrifuge; 6000 RPM/15 min | | 3 |
| 3 | centrifuge; 6000 RPM/15 min | resuspension/centrifuge; 6000 RPM/15 min | | 3 |
| 4 | centrifuge; 6000 RPM/15 min | resuspension/centrifuge; 6000 RPM/15 min | | 3 |
| 6 | centrifuge; 9000 RPM/15 min | resuspension/centrifuge; 9000 RPM/15 min | tap water Ludwigsfelde | 2 |
| 7 | centrifuge; 9000 RPM/15 min | resuspension/centrifuge; 9000 RPM/15 min | | 2 |
| 8 | centrifuge; 9000 RPM/15 min | resuspension/centrifuge; 9000 RPM/15 min | | 2 |

TABLE 4-continued

| | | Example | | |
| | | 19 | | |
| 18 Device | Type | Washing liquid | Amount of washing liquid kg/kg of dry particulate carbon material | |
|---|---|---|---|---|
| 9 centrifuge; 9000 RPM/15 min | resuspension/centrifuge; 9000 RPM/15 min | | 2 | |
| 10 centrifuge; 9000 RPM/15 min | resuspension/centrifuge; 9000 RPM/15 min | | 2 | |
| 11 centrifuge; 9000 RPM/15 min | resuspension/centrifuge; 9000 RPM/15 min | | 2 | |

In the fourth step, the dewatered and possibly washed raw particulate carbon material is dried and possibly ground.

The dewatered raw particulate carbon material and remaining liquid is dried at an elevated temperature (20, see Table 5), whereby the particulate carbon material is obtained. Subsequently, the particulate carbon material can be de-agglomerated (21, see Table 5).

TABLE 5

| | Example | |
| | 20 | 21 |
| — | ° C. | — |
|---|---|---|
| 1 | 105 | jet mill with classifier wheel |
| 2 | 105 | jet mill with classifier wheel |

TABLE 5-continued

| | Example | |
| | 20 | 21 |
| — | ° C. | — |
|---|---|---|
| 3 | 105 | jet mill with classifier wheel |
| 4 | 105 | jet mill with classifier wheel |
| 6 | 105 | — |
| 7 | 105 | — |
| 8 | 105 | — |
| 9 | 105 | — |
| 10 | 105 | — |
| 11 | 105 | — |

Quality of the obtained particulate carbon material from Examples 1-11: In the end, an expression of the particulate carbon material according to the invention is obtained (see Table 6):

TABLE 6

| Example | Carbon Wt-% dry, ash-free | Oxygen Wt-% dry, ash-free | Ash content Wt-% dry | STSA m²/g | OAN Value ml/100 g | pH[1] — | BB[2] % | D/G[3] — |
|---|---|---|---|---|---|---|---|---|
| 1 | 72.3 | 21.7 | 4.9 | 17.7 | 94.4 | 8.7 | 9.8 | 0.52 |
| 2 | 71.9 | 22.3 | 4.6 | 12.6 | 80.5 | 8.5 | 9.5 | 0.65 |
| 3 | 70.9 | 22.8 | 5.3 | 13.6 | 84.1 | 8.8 | n.d. | n.d. |
| 4 | 70.7 | 22.8 | 5.3 | 10.8 | 74.0 | 8.8 | n.d. | n.d. |
| 6 | 69.5 | n.d. | n.d. | 26.9 | n.d. | n.d. | n.d. | n.d. |
| 7 | 69.8 | n.d. | n.d. | 19.2 | n.d. | n.d. | n.d. | n.d. |
| 8 | 70.1 | n.d. | n.d. | 14.0 | n.d. | n.d. | n.d. | n.d. |
| 9 | 70.2 | n.d. | n.d. | 9.9 | n.d. | n.d. | n.d. | n.d. |
| 10 | 70.4 | n.d. | n.d. | 2.6 | n.d. | n.d. | n.d. | n.d. |
| 11 | 70.3 | n.d. | n.d. | 36.7 | n.d. | n.d. | n.d. | n.d. |

| Example | D50[4] µm | D90[4] µm | D99[4] µm | average sphere diameter )[5] µm | D50/ average sphere diameter — | BET m²/g | Water content % |
|---|---|---|---|---|---|---|---|
| 1 | 1.6 | 3.1 | 4.4 | 0.23 | 7.0 | 19.9 | 0.8 |
| 2 | 1.5 | 2.8 | 4.0 | 0.32 | 4.7 | 14.2 | 1.9 |
| 3 | 1.4 | 2.4 | 3.2 | 0.29 | 4.7 | 14.4 | 1.3 |
| 4 | 1.5 | 2.6 | 3.3 | 0.37 | 4.1 | 10.0 | 1.5 |
| 6 | n.d. | n.d. | n.d. | 0.15 | n.d. | 28.3 | 1.5 |
| 7 | n.d. | n.d. | n.d. | 0.21 | n.d. | 20.2 | 2.4 |
| 8 | n.d. | n.d. | n.d. | 0.29 | n.d. | 14.7 | 1.3 |

TABLE 6-continued

| 9 | n.d. | n.d. | n.d. | 0.40 | n.d. | 10.4 | 1.6 |
| 10 | n.d. | n.d. | n.d. | 1.56 | n.d. | 2.7 | 2 |
| 11 | n.d. | n.d. | n.d. | 0.11 | n.d. | 38.6 | 1.3 |

)[1] = in 15% suspension;
)[2] = resistance to bases in % of the dissolved material;
)[3] = from the Raman spectrum;
)[4] = from the grain size determination by means of laser diffraction
)[5] = calculated from STSA and particle density;
n.d. = not determined

Examples 12A-D and Reference Example for the Manufacture of Rubber Articles Made of SBR with the Particulate Carbon Material from Examples 1 and 2 or with Carbon Black N 660

The carbon materials obtained according to the exemplary embodiments 1 and 2 are introduced into a rubber mixture as filler and vulcanized by means of further additives. The composition of the rubber mixture is shown in Table 7.

TABLE 7

| | Reference | A | B | C | D | |
|---|---|---|---|---|---|---|
| Elastomer type | sSBR | sSBR | sSBR | sSBR | sSBR | — |
| Elastomer quantity | 100 | 100 | 100 | 100 | 100 | phr |
| Filler type | N660 | particulate carbon material acc. to Ex. 2 | particulate carbon material acc. to Ex. 2 | particulate carbon material acc. to Ex. 1 | particulate carbon material acc. to Ex. 2 | — |
| Filler quantity | 40 | 40 | 40 | 40 | 60 | phr |
| Coupling reagent Type | — | — | Si69 | Si69 | Si69 | — |
| Coupling reagent Quantity | — | — | 3.2 | 3.2 | 4.8 | phr |
| ZnO | 3 | 3 | 3 | 3 | 3 | phr |
| Stearic acid | 2 | 2 | 2 | 2 | 2 | phr |
| DPG | 2 | 2 | 2 | 2 | 2 | phr |
| CBS | 1.5 | 1.5 | 1.5 | 1.5 | 1.5 | phr |
| Sulfur | 1.5 | 1.5 | 1.5 | 1.5 | 1.5 | phr | phr: parts per hundred rubber, quantity based on elastomer quantity
DPG, CBS: vulcanization accelerator
Si69: coupling reagent As SBR, solution SBR (sSBR) Buna VSL 4526-0 HM of Lanxess was used. It is a copolymer comprising 26 wt-% styrene beside butadiene. Its Mooney viscosity is 65 ME (ASTM D 1646). Zinc oxide, stearic acid and sulfur were obtained from Fischer Scientific. 2-N-cyclohexyl benzothiazole sulfenamide (CBS) was obtained from Lanxess. 1,3-Diphenylguanidine (DPG) was used from Sigma-Aldrich Co., LLC, USA. The process oil TDAE (VIVATEC 500) was obtained from Klaus Dahleke K G. The antioxidant 2,2,4-trimethyl-1,2-dihydroquinoline polymer TMQ was supplied by C. H. Erbslöh, Krefeld. N-(1,3-dimethylbutyl)-N'-phenyl-P-phenylenediamine (6PPD) was obtained from abcr GmbH & Co. KG, Karlsruhe. Bis(triethoxysilylpropyl)tetrasulfide was used as coupling reagent, which is sold by Evonik Industries under the name Si69®.

SBR was placed in the internal mixer (Haake Rheomix 600P, ThermoFisher Scientific, Karlsruhe) at 145° C. and a fill factor of 0.7, corresponding to a volume of 56 cm³. Subsequently, the fillers were added in two stages. For the complete silanization, after possibly adding the silane Si69, the temperature in the internal mixer was kept in a range between 140-165° C. for 10 min and mixing was effected at a rotational speed of 60 min⁻¹.

The addition of the antioxidants and vulcanization additives was effected on a two-roller rolling mill (Polymix-110L, Servitec Maschinen Service GmbH, Wustermark) at a starting temperature of 50° C. and a constant friction of 1:1.2.

The rubber mixtures Reference and A (Table 7) are cross-linked by using a vulcanization process customary for the application of carbon black. The rubber mixtures B, C and D (Table 7) are cross-linked by using a vulcanization process customary for the application of silica together with Si69. The samples were vulcanized in a laboratory press TP1000 (Fontijne Grotnes B. V., Vlaardingen, Netherlands) at 160° C. and a pressing force of 150 kN. The optimum vulcanization time $t_{90}$ was determined by means of a Rubber Process Analyzer (Scarabaeus SIS-V50, Scarabaeus GmbH, Wetzlar).

Figure 1:
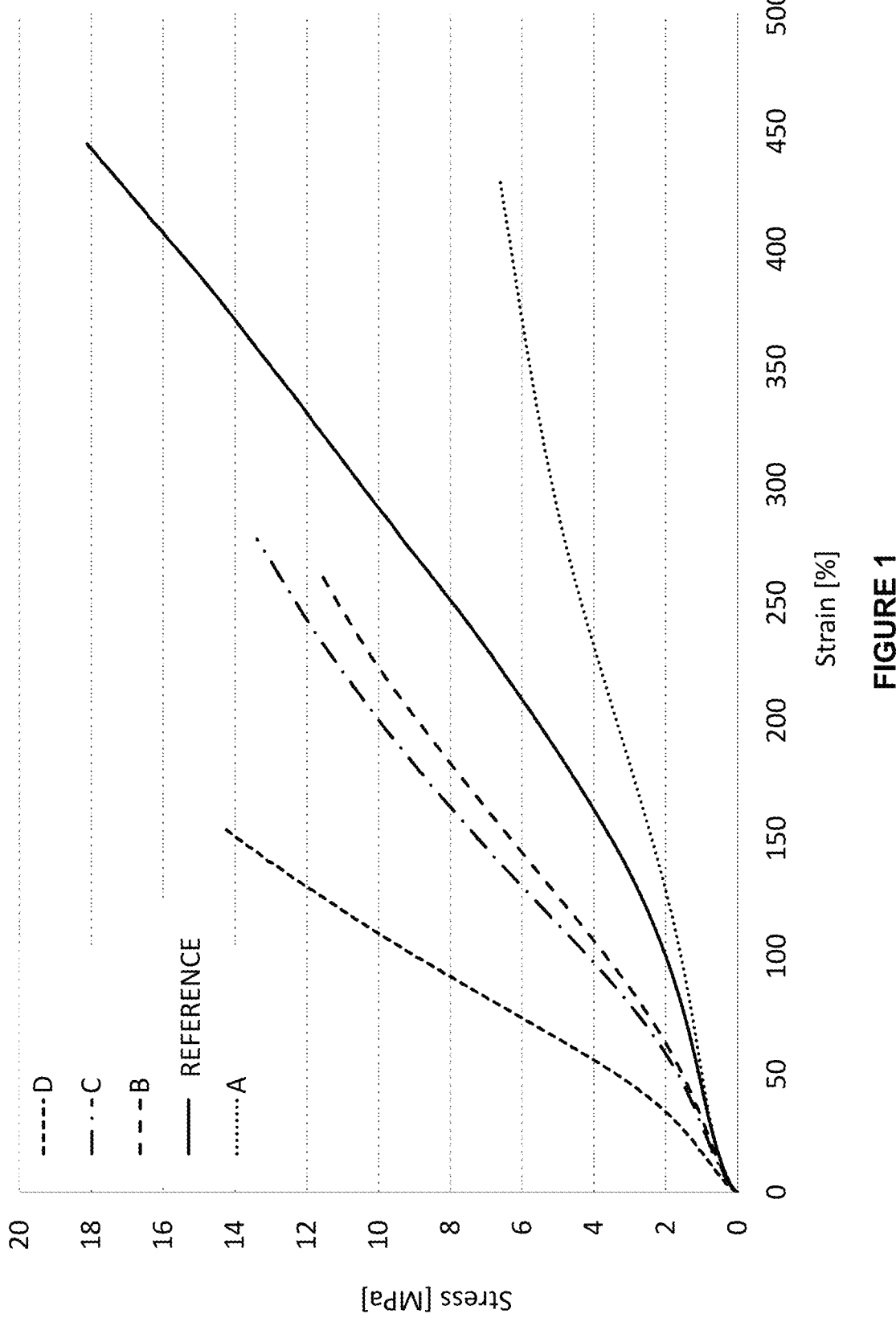
FIG. 1 shows a diagram of the stress-strain distribution in the tensile test as an example for the rubber-technological characteristic values of cross-linked rubber articles made of SBR with the particulate carbon material according to the invention and of the associated reference.

The mechanical characterization was made on DIN S2 test specimens according to DIN 53504 with a Zwick/Roell-Z010 materials testing machine (Zwick GmbH & Co KG, Ulm) with optical strain sensor at a crosshead speed of 200 mm/min at room temperature. The stress-strain distributions in the tensile test as an example for the rubber-technological properties of the obtained rubber articles from Examples A-D of Table 7 are indicated in the diagram of FIG. 1.

In particular in the case of Examples B, C and D (in which a coupling reagent is added) the same show comparable properties as the filler N660. The values for the modulus 50%, modulus 100% and modulus 200% of Examples B and C are at least as high as for the Reference. Furthermore, it is shown that the increase of the filling degree from 40 phr (B) to 60 phr (D) of the particulate carbon material according to Example 2 at a strain in the lower range (up to 100%) leads to an increase of the stress values, i.e. of the modulus 50% and of the modulus 100%. In addition, it becomes clear that an increase of the STSA surface area and the OAN value of the particulate carbon material from the values of Example 2 to the values of Example 1 at the same filling degree leads to an improvement of the tensile strength and to higher values of the modulus 50%, modulus 100% and modulus 200% (compare B and C). Furthermore, it becomes clear that the particulate carbon material from Example 2 with its STSA surface area of 12.6 $m^2/g$ already shows a comparable stress-strain distribution in the tensile test as the classical carbon black N660, which is characterized by an STSA surface area of 34 $m^2/g\pm5$ $m^2/g$.

Figure 2:
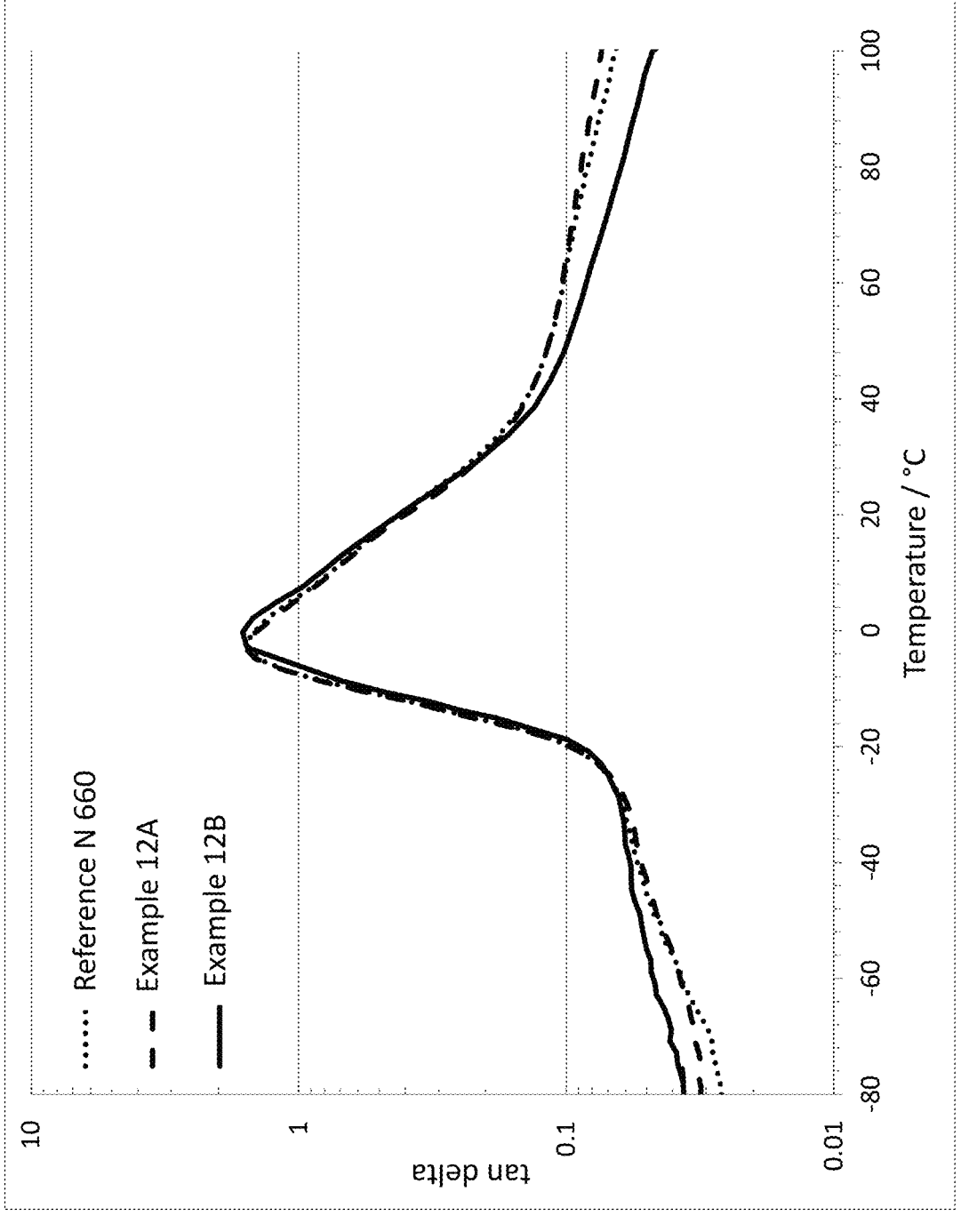
FIG. 2 shows a diagram of the curves of the loss factor tan delta (logarithmic scaling) in dependence on the temperature at completely cross-linked articles made of SBR with the particulate carbon material according to the invention and at the reference with N 660, respectively.

The loss factor tan delta (quotient of loss modulus E" and storage modulus E' of the elastomer material) in dependence on the temperature, determined in a dynamic mechanical analysis (temperature sweep), is shown in FIG. 2 and Table 8.

The mixtures with N660 (reference) and those with the particulate carbon material from Example 2 without coupling reagent (Example 12A) show similar glass transition temperatures ($T_{g,SBR}=-2.91°$ C.; see the peak of the curve tan delta vs. temperature in FIG. 2). These two mixtures also have a similar rigidity in the rubber plateau region above the glass transition temperature. The tan delta curves are close to each other, wherein the curve of the reference mixture from about 76° C. however is slightly lower than that of Example 12A and thus indicates a slightly lower energy loss.

The use of the particulate carbon material from Example 2 in combination with a coupling reagent (Example 12B) leads to significant changes. As compared to Reference and 12A, the glass transition temperature of the mixture of Example 12B is shifted upwards to $T_{g,SBR}=-0.48°$ C. Under the conditions of a weak dynamic elongation (0.5%) the energy loss properties of the mixture 12B are distinctly improved with respect to the Reference with N660, which is revealed by the lower curve profile in the temperature range above the glass transition temperature.

It can be seen that the elastomer material that contains the particulate carbon material from Example 2 and a coupling reagent has lower values as compared to the Reference with N660 for tan delta above the glass transition temperature, which allows a comparatively reduced rolling friction to be expected for a tire made of this material.

TABLE 8

|  | tan delta 60° C. | tan delta 0° C. |
|---|---|---|
| Reference N660 | 0.1020 | 1.4342 |
| Example 12 A | 0.1035 | 1.4023 |
| Example 12 B | 0.0840 | 1.6208 |

FIG. 2 also reveals that the tan delta of Example 12B is higher at 0° C. than for the Reference, which allows an improved wet grip of a tire made of the mixture of Example 12B to be expected.

Comparative Example 13 for the Manufacture of Rubber Articles from SBR with Untreated Lignin According to the prior art, untreated lignin has already been used in rubber mixtures. The following comparative example shows the different effect of untreated lignin and of the carbon material according to the invention in a rubber mixture.

Lignin 3 from Table 2 is introduced into a rubber mixture as filler for comparison and vulcanized by means of further additives. The composition of the rubber mixture corresponds to the composition in Example 12B, wherein however untreated lignin 3 now is used instead of the particulate carbon material from Example 2. The rubber mixture for Example 13 is cross-linked by using a vulcanization process customary for the application of silica together with Si69.

The stress-strain distribution in a tensile test as an example for the rubber-technological properties of the obtained rubber article is indicated in the diagram of FIG. 3 together with the results of Example 12A and 12B.

It can be seen that even when the coupling reagent silane Si69 is used, the effect in the rubber mixture caused by untreated lignin (Example 13) is distinctly weaker than the effect caused by the carbon material according to the invention as such (Example 12A) and quite particularly distinctly lags behind the effect of the carbon material according to the invention in combination with silane Si69 (Example 12B).

Example 14 for the Determination of the [14]C Content in the Product of Example 2

For the purpose of determining the $^{14}$C content the material of Example 2 was supplied to the Poznań Radiocarbon Laboratory, Foundation of the A. Mickiewicz University, ul. Rubież 46, 61-612 Poznań. The used method is described by the head of the laboratory, Tomasz Goslar, on the Internet site of the institute. The contents essential for lignin are summarized below.

Procedure for [14]C Dating by Means of AMS Technology with the Following Steps:

chemical pretreatment production of $CO_2$ and graphitization

[14]C measurement by AMS calculation and calibration of the $^{14}$C age

The methods of the chemical pretreatment are described in principle in Brock et al., 2010, Radiocarbon, 52, 102-112.

Samples of plant residues are treated with 1 M HCl (80° C., 20+ min), 0.025-0.2 M NaOH (80° C.) and then with 0.25 M HCl (80° C., 1 h). After treatment with each reagent, the sample is washed with deionized water (Millipore) to pH=7. For the first HCl treatment a longer period (20+) is used, when the sample still reveals the development of gas bubbles. The step of the NaOH treatment is repeated several times, in general until no more coloration of the NaOH solution occurs (the coloration of the solution is caused by humic acids dissolved in NaOH), but the NaOH treatment is stopped when there is a risk of the complete dissolution of the sample.

In the case of organic samples the $CO_2$ is produced by combustion of the sample.

The combustion of the sample is carried out in the closed quartz tube (under vacuum) together with CuO and Ag wool at 900° C. for 10 hours. The obtained gas ($CO_2$+steam) then is dried in a vacuum apparatus and reduced with hydrogen ($H_2$) by using 2 mg of Fe powder as catalyst. The obtained mixture of carbon and iron then is pressed into a special aluminum holder corresponding to the description of Czernik J., Goslar T., 2001, Radiocarbon, 43, 283-291. In the same way, the standard samples are produced, e.g. samples that contain no [14]C (coal or IAEA C1 Carrara marble) and samples of the "International modern $^{14}$C standard" (oxalic acid II).

The measurements described here are carried out in the AMS $^{14}$C laboratory of A. Mickiewicz University in Poznań.

The content of $^{14}$C in the carbon sample is measured with the spectrometer "Compact Carbon AMS" (manufacturer: National Electrostatics Corporation, USA), which is described in the article Goslar T., Czernik J., Goslar E., 2004, Nuclear Instruments and Methods B, 223-224, 5-11. The measurement is based on the comparison of the intensities of the ion beams of $^{14}$C, $^{13}$C and $^{12}$C, which are measured for each sample and each standard (modern standard: "oxalic acid II" and standard for carbon free from [14]C ("background"). In each AMS run 30-33 samples of unknown age are measured in alternation with 3-4 measurements of the modern standard and 1-2 background measurements. When organic samples are dated, the background is represented by coal.

Conventional $^{14}$C age is calculated by using the correction for the isotope fractionation (according to Stuiver, Polach 1977, Radiocarbon 19, 355), based on the ratio $^{13}C/^{12}C$ which is determined in the AMS spectrometer simultaneously with the ratio $^{14}C/^{12}C$ (note: the measured values of $\delta^{13}C$ depend on the isotope fractionation during the $CO_2$ reduction and the isotope fractionation within the AMS spectrometer, and as such they cannot be compared with the values $\delta^{13}C$ that are determined for gas samples with conventional mass spectrometers). The uncertainty of the calculated $^{14}$C age is determined by means of the uncertainty resulting from the count statistics, likewise the scattering (standard deviation) of the individual $^{14}C/^{12}C$ results. The uncertainties of the $^{14}C/^{12}C$ ratios measured for the standard samples are additionally taken into account. The 1-sigma uncertainty of the conventional $^{14}$C age, which is indicated in the report, is the best approximation of the absolute uncertainty of the measurement.

The calibration of the $^{14}$C age is carried out with the program OxCal ver. 4.2 (2014) the fundamentals of which are described in Bronk Ramsey C., 2001, Radiocarbon, 43, 355-363, while the current version is described in Bronk Ramsey C., 2009, Radiocarbon, 51, 337-360 and Bronk Ramsey C. and Lee S., 2013, Radiocarbon, 55, 720-730. The calibration is made against the latest version of the $^{14}$C calibration curve, i.e. INTCAL13 (Reimer P. J., et al. 2013, Radiocarbon, 55(4), 1869-1887).

The analysis provides the age of the carbon sample for archaeological purposes. The measurement result however can also be indicated as the specific activity. In the present case of the material of Example 2, the analysis provided a value of 243.30±0.52 Bq/kgC or Bq/kg of carbon for the specific activity.

Example 15 for the Manufacture of Rubber Articles from SBR with the Particulate Carbon Material of Example 2 in the Presence of a Reagent Masking Functional Groups The carbon material obtained according to exemplary embodiment 2 is introduced into a rubber mixture as filler and vulcanized by means of further additives. The composition of the rubber mixture and its processing corresponds to that of Example 12B (Table 7), wherein however the silane Si69 is replaced in equimolar proportion by triethoxymethylsilane, which corresponds to a use of 1.06 phr. The further processing also is analogous to Example 12.

The triethoxymethylsilane is not able to be incorporated into the cross-linkage via sulfur bridges. However, it reacts with the surface of the carbon material according to the invention by consuming the functional groups. The functional groups reacting with the silane are outwardly replaced by methyl groups, which as compared to the non-modified starting material leads to a compatibilization of the filler surface with the non-polar rubber matrix.

The carbon material according to the invention treated with triethoxymethylsilane for example effects a higher tensile strength in the rubber as compared to the carbon material used without silane, but as expected lags behind the carbon material in combination with the coupling silane Si69.

The stress-strain distribution in a tensile test as an example for the rubber-technological properties of the obtained rubber articles of FIG. 4 shows that in selected rubber systems and for selected applications it may be expedient to perform a masking of the functional groups.

Examples 16A and B as Well as Reference for the Manufacture of Rubber Articles from NR/BR With the Particulate Carbon Material of Example 2 or with Carbon Black N660

The carbon material obtained according to exemplary embodiment 2 is introduced as filler into a mixture of NR and BR and vulcanized by means of further additives.

In the case of A and the Reference a mixture (pre-mix) of NR and BR initially is prepared in the internal mixer (Haake Rheomix 600P, ThermoFisher Scientific, Karlsruhe) at a starting temperature of 120° C., which then is mixed with the respective filler and further components. In the case of B by contrast a master batch of BR, the filler and silane initially is prepared in the internal mixer (starting temperature 35° C., rotational speed 60 min$^{-1}$), which subsequently is further processed with NR and the remaining components (likewise in the internal mixer, starting temperature 120° C., rotational speed 60 min$^{-1}$). The quantity composition of both processing variants is identical.

The stress-strain distributions in the tensile test as an example for the rubber-technological properties of the obtained rubber articles from Examples A and B are indicated in the diagram of FIG. 5. The same show that in NR/BR mixtures the carbon material according to the invention can be used for reinforcement. Furthermore, it can be seen that the order of processing has an influence on the performance of the filler in the articles made of the respective NR/BR rubber mixture in the cross-linked condition. In this way, modulus and tensile strength can be influenced.

Examples 17A and B as Well as Reference for the Manufacture of Rubber Articles from NBR By Using the Particulate Carbon Material of Example 4 or N 990

The carbon material obtained according to exemplary embodiment 4 is introduced into NBR as filler and vulcanized by means of further additives, but without a coupling reagent. The composition of the rubber mixture is shown in Table 9.

TABLE 9

|  | Reference | A | B |
| --- | --- | --- | --- |
| Perburan 3945 | 100.0 | 100.0 | 100.0 |
| ZnO | 5.0 | 5.0 | 5.0 |
| Stearic acid | 1.0 | 1.0 | 1.0 |
| Mesamoll II | 15.0 | 15.0 | 15.0 |
| Talc | 80.0 | 80.0 | 80.0 |
| N 500 | 30.0 | 30.0 | 30.0 |

TABLE 9-continued

|  | Reference | A | B |
|---|---|---|---|
| N 990 | 80.0 | 40.0 |  |
| Material of Example 4 |  | 40.0 | 80.0 |
| Vulkanox 4010 | 3.0 | 3.0 | 3.0 |
| Sulfur | 0.5 | 0.5 | 0.5 |
| MBTS | 1.0 | 1.0 | 1.0 |
| TMTD | 3.0 | 3.0 | 3.0 |

The mixtures are prepared on a Haake Rheomix 600 (tangential rotor geometry, 78 cm$^3$) with a starting temperature of 40° C. and a rotor speed of 100 min$^{-1}$. Initially, the NBR polymer is mixed for 2 min, then in addition stearic acid, ZnO, possibly material from Example 4 and talcum for 2 min, in addition possibly N990 and Mesamoll II for another 4 min, antioxidants for another 3 min, and the vulcanization chemicals for another 2 min. The optimum vulcanization time was determined by means of a Rubber Process Analyzer and the mixture was vulcanized at 160° C. for a minute value of ($t_{90}$+1/mm of layer thickness).

The determination of the Shore A hardness was effected according to DIN 53505: 2000-08, the tensile test according to DIN 53504:2009-10, and the storage for 72 h at 70° C. in oil Lubrizol OS 206304 according to DIN ISO 1817:2008-08.

The values shown in Table 10 were obtained.

TABLE 10

| Example |  | Reference | A | B |
|---|---|---|---|---|
| Shore A hardness |  | 83 | 84 | 85 |
| Tensile strength (MPa) |  | 9.9 | 11.1 | 11.4 |
| Elongation at break (%) |  | 235 | 253 | 248 |
| Modulus (MPa) | 50% | 4.7 | 5.3 | 5.6 |
|  | 100% | 6.6 | 7.5 | 8.0 |
|  | 200% | 9.7 | 10.8 | 11 |

It becomes clear that both with a partial and with a complete replacement of N 990 by the carbon material according to the invention of Example 4 without the addition of a coupling reagent, comparable or even slightly improved values are achieved in the tensile test, see FIG. 6. The same applies for the variations of the values after storage in oil as shown in Table 11. When replacing inactive carbon blacks such as N 990, the use of the carbon material according to the invention in its quality according to Example 4 without a coupling reagent is sufficient to achieve comparable values.

TABLE 11

| Changes after storage in engine oil 72 h/70° C. | Reference | A | B |
|---|---|---|---|
| in the weight % | −2.6 | −2.6 | −2.7 |
| in the volume % | −3.4 | −3.3 | −3.3 |
| in the hardness | +3 | +3 | +3 |
| in the tensile strength % | +6 | +12 | +11 |
| in the elongation at break % | −9 | −6 | −10 |

The invention claimed is:

1. A method of utilizing a particulate carbon material producible from renewable raw materials, wherein the particulate carbon material comprises:

a statistical thickness surface area (STSA) of at least 5 m$^2$/g and maximally 200 m$^2$/g, a carbon content based on ash-free dry substance from 60 weight % to 80 weight %, and an oxygen content based on ash-free substance in a range of between 20 wt.-% and 30 wt.-%, the method comprising: mixing the particulate carbon material with an ingredient comprising: a polymer, a rubber, or a plastic to form a polymer mixture, a rubber mixture, or a plastic mixture, respectively.

2. The method according to claim 1, wherein the particulate carbon material is effective as a filler in the rubber mixture or the plastic mixture.

3. The method according to claim 1, wherein the renewable raw materials are lignin-containing biomass.

4. The method according to claim 1, wherein the particulate material is produced by hydrothermal treatment of the renewable raw materials.

5. The method according to claim 1, wherein the particulate carbon material has at least one of the following further characteristics:

a $^{14}$C content of greater than 0.20 Bq/g of carbon and less than 0.45 Bq/g of carbon;

an oil absorption value (OAN) from 50 ml/100 g to 150 ml/100 g; and the carbon content based on ash-free dry substance is from 60 weight % to 75 weight %.

6. A mixture comprising an ingredient and at least one particulate carbon material producible from renewable raw materials and at least one polymer, wherein the particulate carbon material comprises:

a statistical thickness surface area (STSA) of at least 5 m$^2$/g and maximally 200 m$^2$/g, a carbon content based on ash-free dry substance from 60 weight % to 80 weight %, and an oxygen content based on ash-free substance in a range of between 20 wt.-% and 30 wt.-%, wherein the ingredient comprises: a polymer, a rubber, or a plastic.

7. The mixture according to claim 6, wherein the particulate carbon material has at least one of the following further characteristics:

a $^{14}$C content of greater than 0.20 Bq/g of carbon and less than 0.45 Bq/g of carbon, an oil absorption value (OAN) between 50 ml/100 g and 150 ml/100 g, and the carbon content based on the ash-free dry substance between 60 weight % and 75 weight %.

8. The mixture according to claim 6, wherein the ingredient comprises a plastic, and the mixture further contains at least one adhesion promoter in a quantity of 2 wt.-% to 16 wt.-% based on a weight of the plastic in the mixture.

9. The mixture according to claim 6, wherein the ingredient comprises a rubber, and the mixture further contains at least one coupling reagent.

10. The mixture according to claim 9, wherein the coupling agent is present in the mixture in a quantity of 2 wt.-% to 16 wt.-% based on a weight of the particulate carbon material in the mixture.

11. The mixture according to claim 10, wherein the at least one coupling reagent comprises at least one organosilane that is selected from the group consisting of: bis (trialkoxysilylalkyl)-oligosulfides or -polysulfides, mercaptosilanes, aminosilanes, silanes with unsaturated hydrocarbon groups, and silanes with large saturated hydrocarbon groups.

12. The mixture according to claim 6, wherein the ingredient comprises a rubber, and the mixture further contains at least one of: (i) at least one reagent, which masks functional groups of the particulate carbon material, wherein the reagent is selected from amines, glycols and organosilanes, (ii) carbon black, and (iii) at least one crosslinker.

13. The mixture according to claim 6, wherein the ingredient comprises a rubber, and a BET surface area of the particulate carbon material differs from the STSA by maximally 20%.

14. The mixture according to claim 6, wherein the ingredient comprises a rubber, and the particulate carbon material is produced by hydrothermal treatment of the renewable raw materials.

15. The mixture according to claim 6, wherein the ingredient comprises a rubber, and the particulate carbon material is not porous or has a pore volume of <0.1 cm³/g.

16. The mixture according to claim 6, wherein the ingredient comprises a rubber, and the rubber is selected from the group consisting of: natural rubber, styrene-butadiene copolymers (SBR), polybutadiene (BR), polyisoprene, isobutylene-isoprene copolymers, ethylene-propylene-diene copolymers, acrylonitrile-butadiene copolymers (NBR), chloroprene, fluorine rubber, acrylic rubber, and mixtures thereof.

17. The mixture according to claim 6, wherein the ingredient comprises a rubber, and the rubber comprises at least two types of elastomers, and in which before combining the elastomer types, the particulate carbon material initially is separately incorporated into at least one of the elastomer types.

18. A method of manufacturing rubber articles comprising: processing the mixture according to claim 6, wherein the ingredient comprises a rubber; and forming one or more of the following articles: tires, tire treads, tire side walls, cable sheaths, hoses, drive belts, conveyor belts, roll coverings, shoe soles, buffers, sealing rings, profiles, and damping elements.

19. A rubber article comprising a vulcanized mixture according to claim 6, wherein the ingredient comprises a rubber, and wherein the rubber article is selected from tires except of pneumatic tires, tire treads, tire side walls, cable sheaths, hoses, drive belts, conveyor belts, roll coverings, shoe soles, buffers, sealing rings, profiles and damping elements.

20. A rubber article comprising a vulcanized mixture according to claim 7, wherein the ingredient comprises a rubber, wherein the rubber article is a pneumatic tire.

21. The mixture according to claim 6, wherein the ingredient is a rubber and the particulate carbon material is present in quantities of 10 wt.-% to 150 wt.-%, based on the weight of the rubber.

\* \* \* \* \*